United States Patent [19]

Greanias et al.

[11] 4,365,235
[45] Dec. 21, 1982

[54] CHINESE/KANJI ON-LINE RECOGNITION SYSTEM

[75] Inventors: Evon C. Greanias, Chappaqua; Ernesto F. Yhap, New York, both of N.Y.

[73] Assignee: International Business Machines Corporation, Armonk, N.Y.

[21] Appl. No.: 221,863

[22] Filed: Dec. 31, 1980

[51] Int. Cl.³ .............................................. G06K 9/62
[52] U.S. Cl. ................. 340/146.3 AC; 340/146.3 SY; 364/518; 364/900; 178/30
[58] Field of Search ............... 364/515, 518, 523, 419, 364/200, 900; 340/146.3 SY, 146.3 AC, 751; 178/30; 400/110, 484

[56] References Cited

U.S. PATENT DOCUMENTS

| | | | |
|---|---|---|---|
| 3,665,450 | 5/1972 | Leban | 340/146.3 AC |
| 4,144,405 | 3/1979 | Wakamatsu | 178/30 |
| 4,195,338 | 3/1980 | Freeman | 364/523 |
| 4,270,022 | 5/1981 | Loh | 178/30 |
| 4,284,975 | 8/1981 | Odaka | 340/146.3 SY |

OTHER PUBLICATIONS

"Handwritten Chinese Character Recognition By an Analysis—By—Synthesis Method" by Yoshida et al., Published in Proceedings of Int. Joint Conf. on Pattern Rec., Oct. 30–Nov. 1, 1973, pp. 197–204.

"Recognition of Printed Chinese Characters by Automatic Pattern Analysis" by Stallings, Published in Computer Graphics and Image Processing, vol. 1, No. 1, Apr., 1972, pp. 47–65.

"Approaches To Chinese Character Recognition" by Stallings, Published in Pattern Recognition, Apr., 1976, vol. 8, No. 2, pp. 87–98.

"Automatic Recognition of Handprinted Characters—The State of the Art" by Suen et al., Published in Proceedings of the IEEE, vol. 68, No. 4, Apr., 1980, pp. 469–487.

Primary Examiner—Gary Chin
Attorney, Agent, or Firm—Philip Young; Jack M. Arnold

[57] ABSTRACT

A Chinese/Kanji on-line recognition system consisting of four main sections, these being tablet electronics, a signal filter and segment integration unit, a base stroke classification unit and a symbol element recognition unit, and a symbol recognition output table. The tablet electronics provides pen coordinate signals and pen up/down signals which are applied to the signal filter and segment integration unit to define segments of strokes which correspond to continuous motion of a pen on a tablet in a fixed direction. The base stroke classification unit classifies the motion of the pen between pen down and pen up occurrences into one of 42 categories and also indicates if the stroke has crossed a prior stroke. This is then analyzed by the symbol element recognition unit which interprets the base strokes that have been recorded for the word and generates a sequence of symbol elements, referred to as "alphabet" components, that occur in this symbol. The sequence of symbol elements are interpreted in the symbol recognition output table which provides a form of a simple table look-up to determine the word that had been written. Only 72 basic symbol elements (alphabet) are required to synthesize all of the Chinese/Kanji vocabulary.

10 Claims, 23 Drawing Figures

SIGNAL FILTERING UNIT

LINE SEGMENT INTEGRATION UNIT

BASE STROKE CLASSIFICATION UNIT

SYMBOL ELEMENT RECOGNITION UNIT

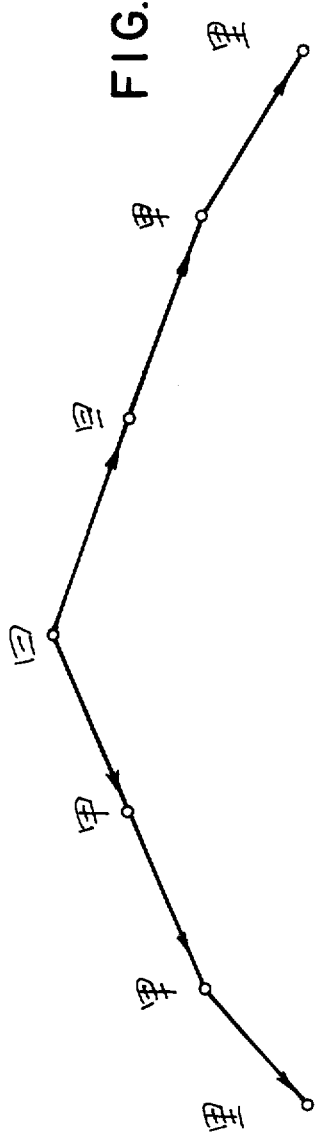
TREE LOGIC FOR CONNECTED ALPHABET SYMBOLS
圭 = (05E),(65E)　　　　　　　OR SIMPLY　(05E 65E)
曲 = (05E),((30E)(53E))　　　OR SIMPLY　(05E 30E 53E)
里 = ((30E)(53E)),(53E)　　　OR SIMPLY　(30E 53E 53E)
粟 = ((30E)(53E)),(37E)　　　OR SIMPLY　(30E 53E 37E)
FIG. 5.1
FIG. 5.2
TREE LOGIC FOR ALTERNATIVE STROKE SEQUENCE

FIG. 5.3

|  |  |  |  |  |  |
|---|---|---|---|---|---|
| 01E | 06E | 05E | 42E |  |  |
| 01E | 06E | 05E | 42E | 12E |  |
| 06E | 06E | 02E | 42E | 05E |  |
| 06E | 01E | 05E | 42E | 05E | 02E |
| 01E | 01E | 02E | 05E | 42E | 05E |
| 01E | 06E | 05E | 42E |  |  |
| 01E | 05E | 42E | 05E | 06E | 02E |
| 01E | 05E | 42E | 05E | 06E |  |

MOST LIKELY SPELLING:

(Figure showing stroke-by-stroke character construction for rows 1- through 11-)

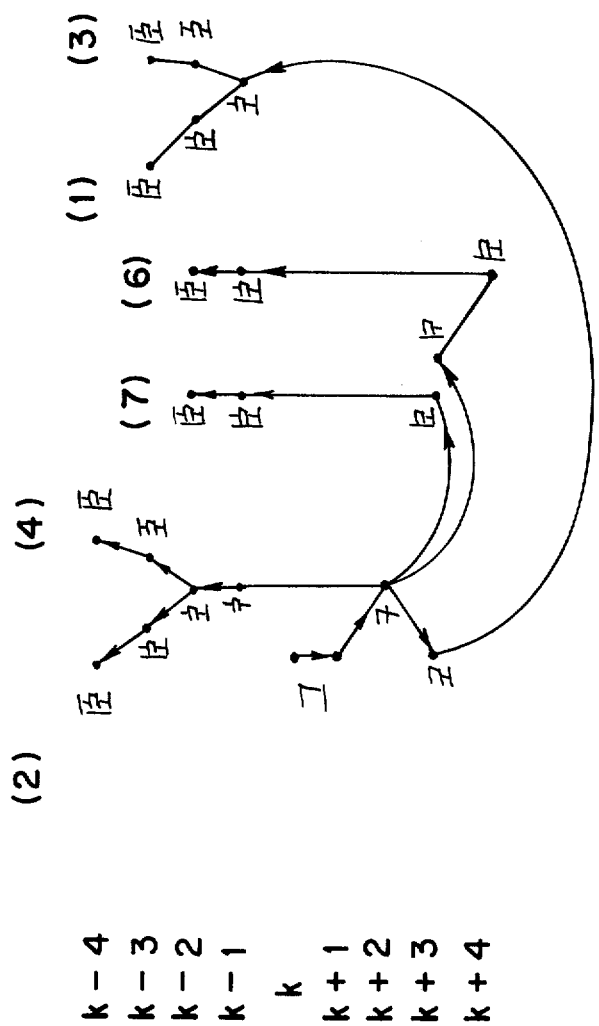

FIG. 6.1 SYMBOL RECOGNITION OUTPUT TABLE
| Symbol Element Sequence Index Field -250- | Symbol I.D. Number |
|---|---|
| — | |
| 6 0 0 5 6 5 6 4 0 0 0 0 0 0 0 0 0 0 0 0 | 1 2 3 4 5 |
| — | |
| 6 0 6 5 0 3 6 4 0 0 0 0 0 0 0 0 0 0 0 0 | 1 2 3 4 5 |
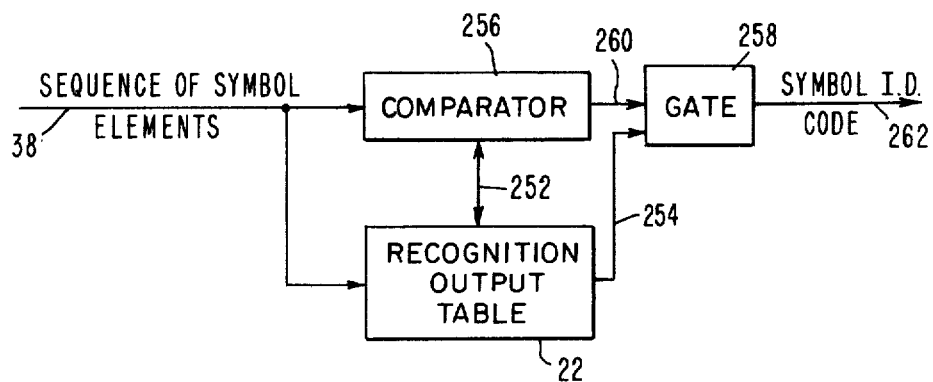
FIG. 6.2

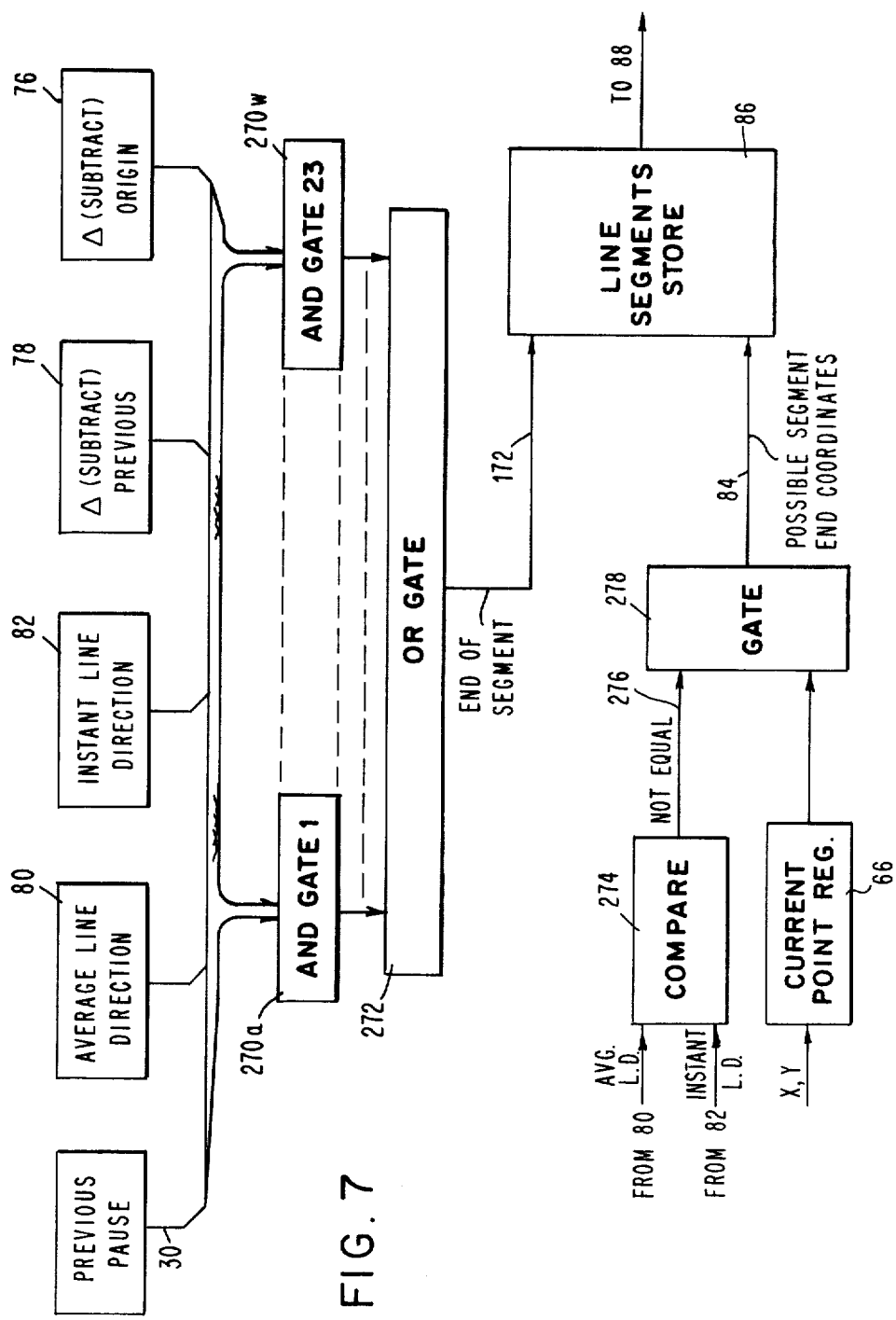

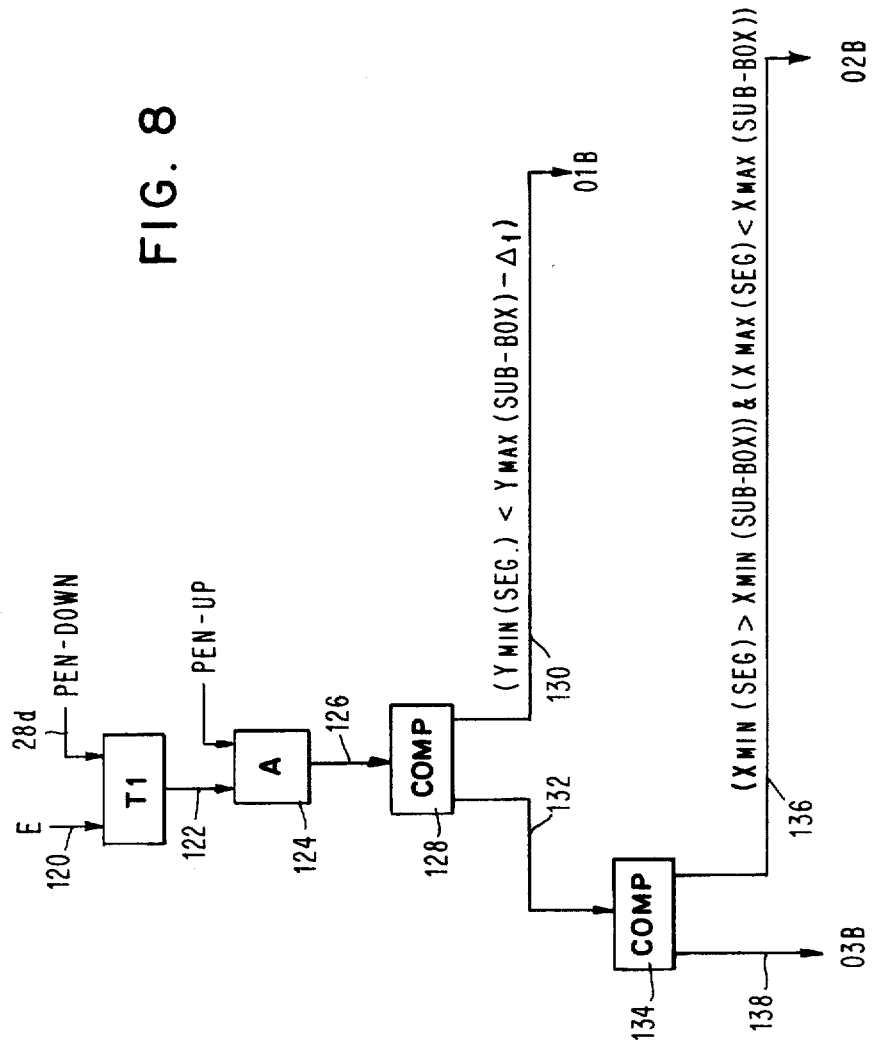

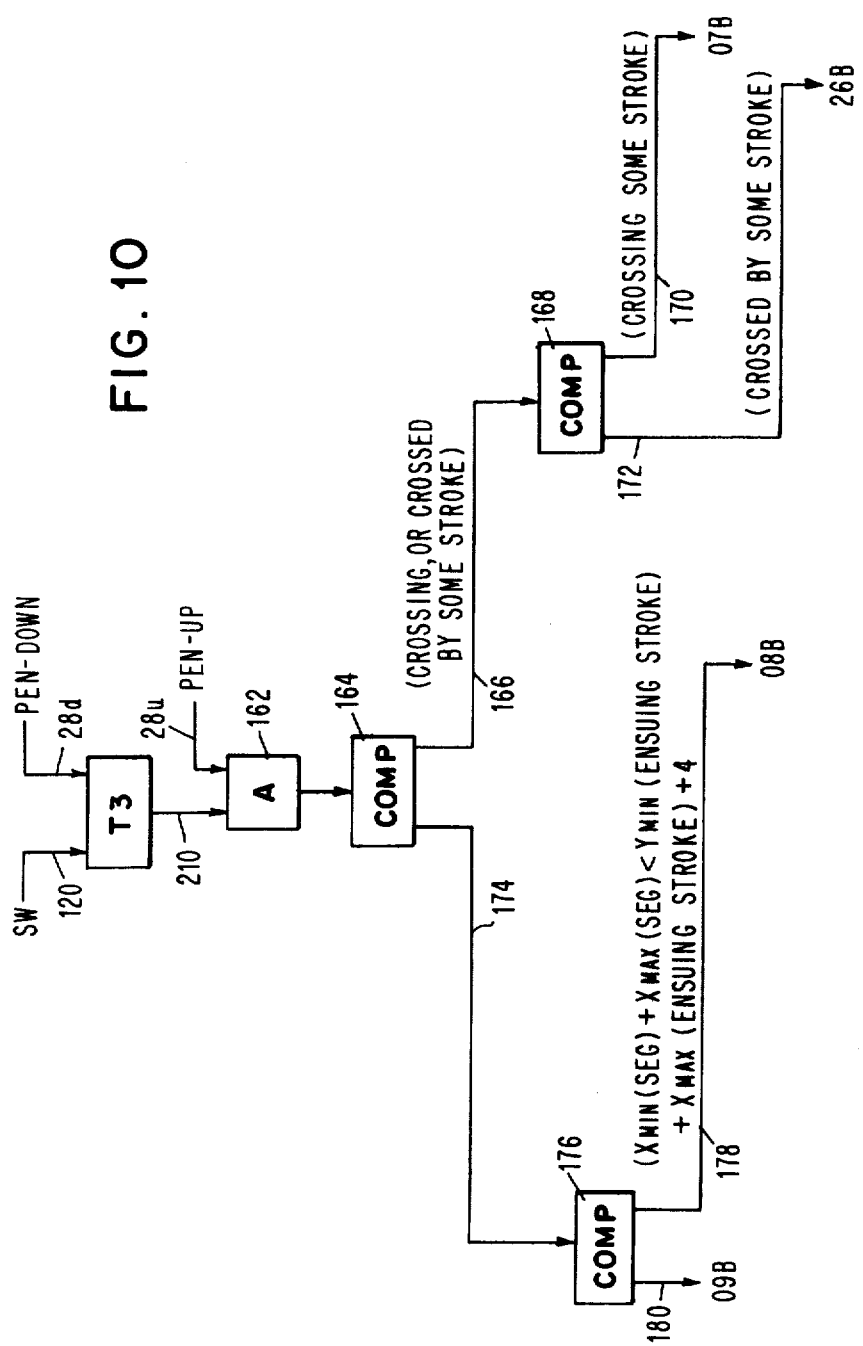

CHINESE/KANJI ON-LINE RECOGNITION SYSTEM

DESCRIPTION

BACKGROUND OF THE INVENTION

The present invention relates to Chinese and Kanji character recognition and, more particularly, to an on-line tablet recognition system with an extendable vocabulary of recognizable Chinese/Kanji words.

The preparation of text (i.e., correspondence, business documents, etc.) usually involves the composition of a sequence of thoughts by one person and the transcription of handwritten or spoken expressions of these thoughts into a printed version by another person. Several iterations are frequently required before the final copy is satisfactory. Each iteration requires substantial intervals of active time and waiting time for both individuals. During these waiting intervals, each person usually turns to other matters. Some time must then be spent in reorientation when the most recent draft is received from the other person. This procedure is both inefficient and subject to errors.

There is presently no commercially available convenient method for entering a large vocabulary of Chinese/Kanji words into text processing and data processing equipment.

In the process of recognizing handwritten Chinese characters, there is a variability of writing style for a given individual as well as differences in writing style from individual to individual. In one known approach for on-line character recognition using a tablet or a light pen input device, character recognition is achieved by two types of information, these being the stroke distribution count and the indentification information for the first and last strokes drawn. Such approach was developed by J. Liu and is described in "Real Time Chinese Handwriting Recognition Machine", M.I.T. Cambridge, E.E. Thesis (1966).

In Liu's scheme, the principal means of discriminating among characters is the stroke distribution count, the number of strokes of each type occurring in the character. Liu distinguishes 19 types of strokes. With the stroke distribution count as the only discriminating criterion for character recognition, there are cases where characters have exactly the same distribution count within a group of at most 5 or 6 characters. Liu discovered that complete discrimination could be achieved by adding as additional information the identities of the first and last stroke drawn for the character.

Each character, then, is assigned a unique identififer consisting of its stroke distribution count and the identity of its first and last strokes. For recognition, successive strokes of a given character are drawn and recognized one by one, and the result compared to the identifiers of all known characters. An exact match is required for recognition.

Liu defined each of his strokes as a sequence of local extrema (relative maximum or relative minimum) along two orthogonal axes which are mathematically defined as the points along a curve where the derivative (either dY/dX or dX/dY) goes to zero. Each extrema is further characterized as smooth or pointed. Finally, certain extrema are "don't care" events: they may occur or not in the sequence.

To achieve stroke recognition, the extrema of a stroke are determined as it is drawn. The resulting sequence is compared with the defined sequences of all 19 strokes, ignoring the presence or absence of don't care extrema. An exact match is required for recognition.

Liu's technique appears to be disadvantageous since it requires an exact match both for stroke recognition and character recognition. Also, the ability to add symbols and extend the vocabulary of recognizable words is difficult.

Thus, the known Chinese and Kanji character recognition schemes generally involve individual strokes which are distinctly used, strokes are counted and classified in accordance with their sequence of occurrence. In one or more systems a tree logic is employed which classifies an incoming stroke into one of a predetermined number of basic strokes, and then analyzes the combination of strokes to determine a predetermined symbol. The successful recognition of the symbol requires (1) proper construction of each stroke of the symbol to satisfy its stroke classification criterion, (2) proper ordering of the strokes to obtain the needed additional discrimination, (3) the presence of that symbol in the set of symbols for which recognition criteria have been defined.

When methods like these are implemented for a specific set of common Chinese symbols, a unique recognition criterion is defined for each symbol. Practical Chinese and Kanji vocabularies require more than two thousand symbols. When the names of people are added, the symbol set exceeds several thousand. If a new symbol is to be added to the existing set, it is necessary to review the previously defined recognition criteria for all the symbols in the existing set to ascertain that the new symbol will not inadvertently satisfy a criterion that has been defined for a prior symbol, and that the proposed criterion for the new symbol cannot be satisfied by one of the original symbols. As the symbol set is enlarged to the size of a practical vocabulary, this analysis becomes very difficult. Many of the detailed criteria for stroke classification and allowable stroke order might require adjustment when a new symbol is added, and as the number of symbol types is increased the acceptable variations for each symbol must be narrowed.

It is an object of the present invention to provide a convenient method for entering a large vocabulary of Chinese/Kanji words into text processing and data processing equipment. It is another object to provide an online tablet recognition system with an extendable vocabulary of recognizable words.

It is another object to provide a method for the direct composition of printed text material, in a "natural manner", by the author without the intervention of another person. The "natural method" that is used is the online recognition of script. Script recognition is favored over other means, such as voice or block letter recognition, because script is by far the most common method used in business for the original composition of text material.

SUMMARY OF THE INVENTION

These, and other objects, are achieved by the present invention which provides a system and method for the recognition of a large vocabulary of Kanji/Chinese symbols as they are written on an electronic tablet. Recognition occurs when a pen motion sequence is detected that is natural for a symbol of this language. The symbols are analyzed in terms of 72 symbol elements that can be used to uniquely describe several thousand Chinese symbols. The repertoire of symbols that can be recognized is easily expanded by providing a description of each additional symbol in the output table of the system using the 72 symbol elements. These new symbol descriptions are created by specifying the sequence of elements required for the construction of the symbol using a syntax that specifies key position information. In those cases where the symbol can be written properly in more than one way, alternative definitions are inserted in the output table.

The invention also provides display feedback to the writer. When the writer completes a symbol, the system displays either a printed version of the symbol or a code that signifies the symbol elements that were detected by the system. If the writer has prepared a new symbol, the code can be added to the output table and assigned the meaning of this new symbol. If the system does not display the printed version of a symbol because it was not written correctly, the writer can rewrite it accordingly.

An important advantage of the subject system is that it provides a method for Kanji/Chinese data entry by writers that have a working knowledge of this language. This system does not require the use of a complex keyboard that is difficult to use and that needs special operators with extensive training in the use of the keyboard. More specifically, the Kanji/Chinese on-line recognition system of the present invention consists of four main sections:

(a) tablet electronics;
(b) a signal filter and segment integration unit;
(c) a base stroke classification unit and symbol element recognition unit; and
(d) a symbol recognition output table.

The tablet electronics provides pen coordinate signals and pen up/down signals which are applied to the signal filter and segment integration unit to define segments of strokes which correspond to continuous motion of a pen on a tablet in a fixed direction. This output is next used in the base stroke classification unit which uses a detection process to classify the motion of the pen between pen down and pen up occurrences into one of 42 categories. This classification also indicates if the stroke has crossed a prior stroke. The base stroke and crossing information is then analyzed by the symbol element recognition unit, which is essentially an alphabet identifier. This operation interprets the base strokes that have been recorded for the word and generate a sequence of symbol elements, referred to as "alphabet" components, that occur in this symbol.

The sequence of symbol elements are then interpreted in the symbol recognition output table which provides a word identification operation in the form of a simple table look-up to determine the word that had been written.

There are 72 basic symbol elements (alphabet) that are used to synthesize all of the Chinese/Kanji vocabulary. This is a fundamental improvement of the subject invention over prior experimental on-line recognition criteria, for the 72 symbol elements are sufficiently broad to recognize the occurrence of these symbol elements in any Chinese word. Therefore, the basic recognition method can be applied to any Chinese/Kanji vocabulary by merely adding words to the output table that represent appropriate spellings of additional Chinese words that are to be added to the vocabulary. This is done without modifying the basic recognition criteria and greatly enhances the utility of the method.

BRIEF DESCRIPTION OF THE DRAWINGS

FIG. 5.1 shows an example of the tree logic used for connected occurrences of two or more of the 72 element alphabet symbols.

FIG. 5.2 shows an example of the tree logic used for alternative stroke sequences.

FIG. 5.3 is an example of the alternate symbol element tree logic.

FIG. 5.4 illustrates the alternate symbol element tree logic using a symbol with an invariant kernel or sub-pattern.

FIG. 6.1 is a schematic diagram of the symbol recognition output table.

FIG. 6.2 is a block diagram of the recognition table readout logic associated with the output table shown in FIG. 6.1.

FIG. 7 is a block diagram of the circuits used in the line segment integration unit of FIG. 3 to provide the logic gating and compare operations.

FIGS. 8-11 show detailed logic diagrams for the single segment stroke tree logic shown in FIG. 4.

DESCRIPTION OF THE PREFERRED EMBODIMENTS

Figure 1:
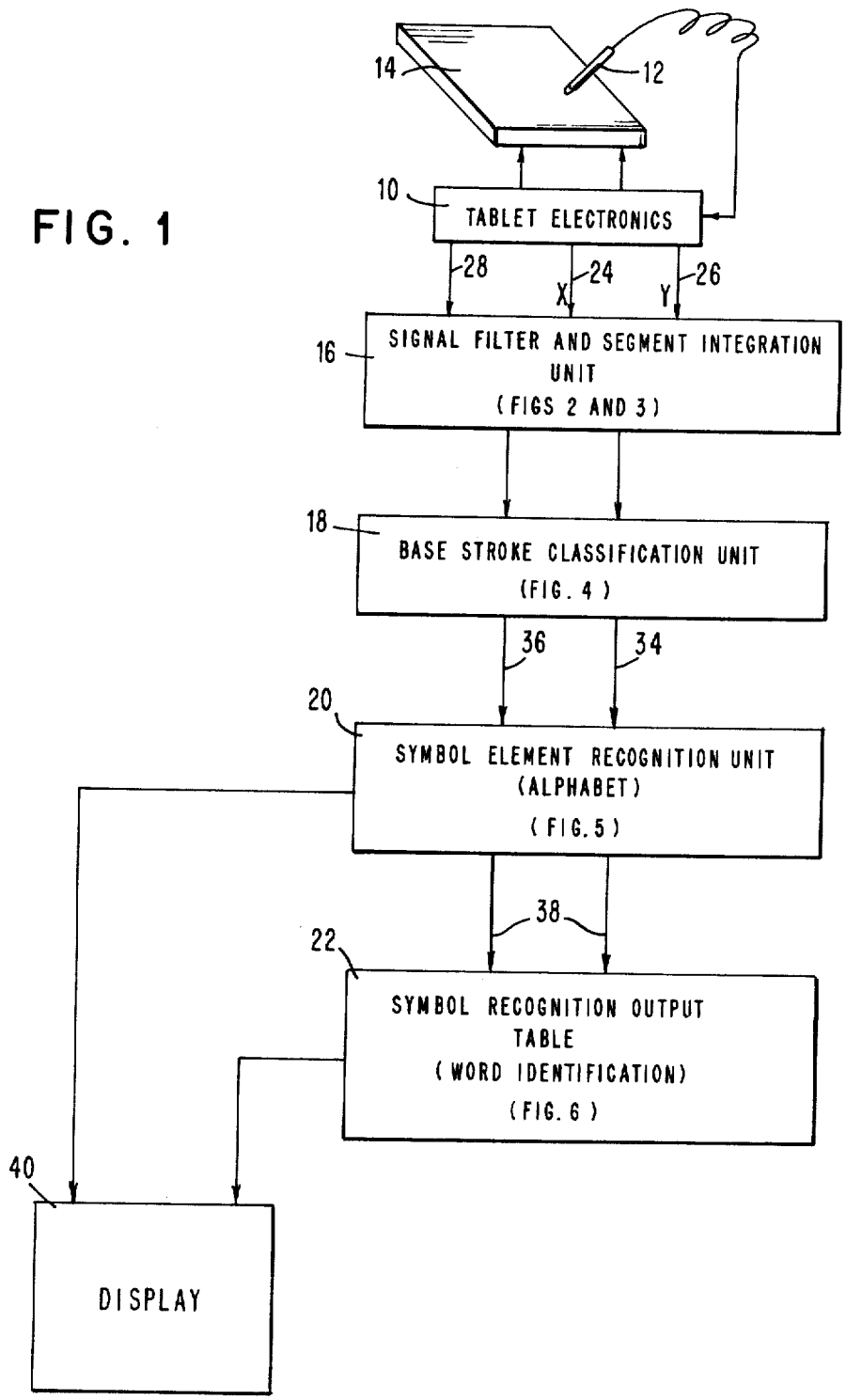
FIG. 1 is a general block diagram of the Kanji/Chinese on-line recognition system of the present invention.

FIG. 1 is a general block diagram of the Kanji/Chinese on-line recognition system of the present invention. The basic recognition system consists of four main sections:

(a) tablet electronics 10;
(b) a signal filter and segment integration unit 16;
(c) a base stroke classification unit 18 and symbol element recognition unit 20; and
(d) a symbol recognition output table 22.

Generally, the tablet electronics unit 10 provides pen coordinate signals and pen up/down signals which are applied to the signal filter and segment integration unit 16 to define segments of strokes which correspond to continuous motion of a pen 12 on a tablet 14 in a fixed direction. This output is next used in the base stroke classification unit 18 which uses a detection process to classify the motion of the pen between pen down and pen up occurrences into one of 42 categories. This classification also indicates if the stroke has crossed a prior stroke. The base stroke category and crossing information is then analyzed by the symbol element recognition unit 20, which is essentially an alphabet identifier. This operation interprets the base strokes that have been recorded for the word and generates a sequence of symbol elements, also referred to as "alphabet" components, that occur in this symbol. The sequence of symbol elements are then interpreted in the symbol recognition output table 22 which provides a word identification operation in the form of a simple table look-up to determine the word that had been written. There are 72 basic symbol elements (alphabet) that are used to synthesize all of the Chinese/Kanji vocabulary. This is a fundamental improvement of the subject invention over prior experimental on-line recognition criteria, for the 72 symbol elements are sufficiently broad to recognize the occurrence of these symbol elements in any Chinese word. Therefore, the basic recognition method can be applied to any Chinese/Kanji vocabulary by merely adding words to the output table that represent appropriate spellings of additional Chinese words that are to be added to the vocabulary. This is done without modifying the basic recognition criteria and greatly enhances the utility of the method.

Tablet Electronic Unit

The tablet electronics is a self contained unit 10 that produces a series of digital signals corresponding to the coordinates of the pen 12 on the surface of the tablet 14. These x and y coordinate signals are produced on lines 24 and 26, respectively, at a constant rate determined by a sampling clock within the tablet electronics unit 10. The frequency of these samples is made high enough to detect all significant shape features produced by the pen 12 during the symbol writing motions. For most writing, a sample rate between 100 and 200 samples per second is adequate. In addition to the pen coordinates, the tablet electronics 10 produce signals on output line 28 that indicate when the pen 12 is touching the tablet 14 and symbols are being written.

There are several different kinds of tablets 14 that might be suitable for this purpose. Some of these employ a sonic emitter on the pen and audio detectors on the tablet to sense the pen location. Others employ modulated electromagnetic radiation from the tablet 14 which is picked up by the pen. The latter type of tablet has been found to be preferable because the radiation detection region is more nearly coincident with the point of the pen and, therefore, greater fidelity is achieved in the recording of pen motion.

Signal Filtering and Segment Integration

These operations are performed in the signal filter and segment integration unit 16 upon the series of pen position signals that are produced when the pen 12 is placed on the tablet 14 surface. Although it is possible to perform these operations with special purpose "hard-wired" electronics, it is most convenient to implement these operations by means of micro-code in a suitable processor, in a manner to be described in detail below. The signals from the tablet 14 are passed to the processor in blocks that correspond to all the strokes of a single symbol. Successive pen positions, received on lines 24, 26, and 28 from the tablet electronics 10, are compared in order to filter out excessive data due to pauses in the pen motion or due to random signal fluctuations. These fluctuations occur as a result of the tablet's finite spatial resolution and sampling time. The filtering algorithm that is used produces new output coordinates whenever the pen position differs from the preceding filter output by a prescribed threshold amount. This filter threshold, also called the filter constant, is adjusted to be somewhat smaller when the pen has begun to move across the table than it is when the pen is placed down on the tablet.

The segment integration operation is designed to assemble the filter output into sequences of straight line segments that approximate continuous motion of the pen during the creation of a stroke. Line segments are classified in eight compass directions; east, southeast, south, etc. Each line segment ends when there is a change in the direction of motion in the successive outputs from the filter. Whenever there is a significant pause in the output coordinates from the filter, or a line segment changes direction, signals are produced on respective lines 30 and 32 which signify the possible end of one line segment and the beginning of the following line segment. These signals cause the coordinates of the line segment end points to be recorded for subsequent use in stroke analysis. The production of line segments continues until a pen up condition occurs signifying completion of the stroke.

Stroke and Symbol Element Recognition

Line strokes, i.e., pen down to pen up, are classified in 42 categories. The definitions of these categories, referred to as "base strokes", are specifically designed to distinguish between important shape components of Kanji/Chinese symbols. These stroke categories are also useful for the analyses of Katakana symbols. The classification of these strokes involves (a) shape of stroke; (b) position of stroke; and (c) intersection with other strokes.

Stroke shapes are defined in terms of the sequence of line segments that occur and the distance between their end points. Shape is the most important parameter for classification of strokes that are not straight lines. Position and intersections are most important for the classification of straight line strokes. The 42 stroke categories are shown in Table I. The base stroke classification unit 18 classifies the motion of the pen 12 between pen down and pen up occurrences into one of such 42 stroke categories and locations and provides this information on line 34 as well as crossing information on line 36.

Symbol elements are generated by the occurrence of one or more base strokes. Twenty-two of the symbol elements are made with a single stroke. These are classified as both base strokes and symbol elements. Table II contains descriptions of the 72 symbol elements. Each of these elements is synthesized by the occurrence of the indicated sequence of base strokes. Many of these conditions also require the successive base strokes to have a particular location with respect to the other portions of the symbol. In some cases the occurrence of successive base strokes causes the tentative symbol element identification to change from one category to another.

In order to implement the base stroke and symbol element detection operations in micro-code on suitable processors, the digital values corresponding to the line segment directions and end point positions for the entire symbol are passed to the stroke and symbol element recognition processors in blocks of convenient size for the successive operations. Details of the circuitry are provided below. The micro-code for the stroke and symbol element detection performs two logic analyses on these values. The first tree-logic examines successive line segment and position data to classify the shape of multi-direction strokes. If the values for a multi-direction stroke do not satisfy all the conditions along one of the paths in the tree-logic, the line segment values for that stroke are revised by assimilating the smallest segments into their preceding neighbor. The revised set of line segment values are then analyzed with the same tree-logic. If the stroke still fails the logic conditions, the line segments are revised again by assimilating the next smallest segments into their preceding neighbor. If all of the logic conditions are still failed, the stroke is rejected. When a stroke is rejected the symbol recognition also fails.

The classification of single direction strokes depends upon the shape and position of the strokes that precede and follow it. The micro-code for this analysis defines a rectangular boundary, called the subbox, that encloses the preceding portions of the symbol. The position of the stroke with respect to the subbox is a factor in determining several base stroke categories. In other cases, the path of single direction strokes are compared with the end points of other strokes of the symbol to detect possible intersections. Intersections are important factors for several base stroke categories. As stated above, the base stroke classification unit 18 provides base stroke category and location data on line 34 and crossing data on line 36.

Symbol element recognition is implemented with the second logic-tree, described in detail below. This tree analyzes the sequence of base strokes, the intersection information, the subbox boundaries, and the location of the base strokes with respect to the subbox. The paths through the logical tree define the conditions that must be met to detect each symbol element. In some cases, there is more than one path through the tree for a single symbol element. This is one of the ways that alternative writing procedures are accommodated. However, when a sequence of base strokes does not satisfy any symbol element, the symbol recognition also fails. After all of the base strokes of the written symbol have been presented to the symbol element recognition unit 20, said unit generates a sequence of symbol elements, referred to above as "alphabet" components that occur in the symbol, that are provided on lines 38 to the symbol recognition output table 22. Symbol elements and words can be outputted onto a display 40.

TABLE 1

| ID | SHAPE | DESCRIPTION |
|---|---|---|
| | BASE STROKE CATEGORIES | |
| 01B | ——— | E and not at bottom of its sub-box. |
| 02B | ——— | E and not at bottom of its sub-box and not horizontally protruding therefrom. |
| 03B | ——— | E and at bottom of its sub-box and horizontally protruding therefrom. |
| 04B | —+— | S and crossing, or crossed by, some other stroke. |
| 05B | \| | S and not crossing nor crossed by, another stroke, and not at left boundary of its sub-box. |
| 06B | \| | S and not crossing, nor crossed by, another stroke, and at left boundary of its sub-box. |
| 07B | —⁄— | SW and crossing another stroke. |
| 08B | ⁄ | SW and not crossing, nor crossed by, another stroke, and followed by a stroke to its right. |
| 09B | ⁄ | SW and not crossing, nor crossed by, another stroke, and not followed by a stroke to its right. |
| 10B | —⟩⟨— | SE and crossing, or crossed by, another stroke. |
| 11B | ⟍ | SE and not crossing another stroke and not short. |
| 12B | ⟍ | SE and not crossing another stroke and short. |
| 13B | 7 7 | $(E/NE/SE)_1 \& (S/SW)_2 \& (W/NW)_3$ and segments longer than some specified length Δ. |
| 14B | 7 | $(E/NE)_1 \& (SW)_2$ and first segment shorter than or equal to second segment. |
| 15B | 7 | $(E/NE)_1 \& (S/SE)_2 \& (E)_3 \&$ (N/NW/NE)$_4$. |
| 16B | ↙ | $(S)_1 \& (NE)_2$ and first segment longer than second segment. |
| 17B | —⁄ | $(E/NE)_1 \& (SW)_2$ and first segment longer than second segment. |
| 18B | 7 7 | $(E/NE)_1 \& (SW)_2 \& (E/NE/SE)_3 \& (S/SW)_4$ with or without a fifth segment: $(NW/W/SW)_5$. |
| 19B | ↙ ↘ | $(S)_1 \& (W/NW)_2$ or $(SE)_1 \& (S)_2 \& (W/NW)_3$. |
| 20B | ⌣ | $(S)_1 \& (E)_2 \& (N/NE/NW)_3$. |
| 21B | ⌣ | $(S/SE)_1 \& (SE/E)_2 \& (N/NE/NW)_3$ and last segment short. |
| 22B | ⌐ | $(E)_1 \& (SW)_2 \& (SE)_3$. |
| 23B | ⌐ ⌐ | $(S/SW)_1 \& (E/NE)_2 \& (S/SW)_3$ and with or without a fourth segment $(NW/W)_4$. |
| 24B | ⌒ | $(E/NE)_1 \& (SW)_2 \& (E)_3 \& (N/NW/NE)_4$. |
| 25B | \| | S and short and not crossing, nor crossed by, another stroke, and at left boundary of its sub-box. |
| 26B | —⁄— | SW and crossed by a subsequent stroke. |
| 27B | ⌐ | $(E)_1 \& (S/SW)_2 (E/NE)_3$ and short segments. |
| 28B | ⌐ | $(E)_1 \& (S)_2$ and both segments short. |
| 29B | ⌐ | $(E)_1 \& (S)_2$ and first segment long and second segment short. |
| 30B | ⌐ | $(E)_1 \& (S)_2$ and first segment short and second segment long. |
| 31B | ⌐ | $(E)_1 \& (S)_2$ and both segments long. |
| 32B | ⌃ | $(SW)_1 \& (SE)_2$. |
| 33B | ⌃ | $(SW)_1 \& (E)_2$. |
| 34B | ⌊ | $(S)_1 \& (E)_2$ and both segments short. |
| 35B | ⌊ | $(S)_1 \& (E)_2$ and first segment short and second segment long. |
| 36B | ⌊ | $(S)_1 \& (E)_2$ and first segment long and second segment short. |
| 37B | ⌊ | $(S)_1 \& (E)_2$ and both segments long. |
| 38B | ⁄ ⁄ | $(S/SE)_1 \& (NE)_2$ and first segment short or missing. |
| 39B | ⌐ | First part same as 18B with following (SE/E). |
| 40B | ⌐ | $(E)_1 \& (S)_2 \& (NE)_3$. |
| 41B | ⟍ | $(NE)_1 \& (SE)_2$. |
| 42B | ○ | If relatively small and last stroke and above last stroke. |

Notes:
The symbol / indicates the "or" function. Also, all the segments in the following shapes are to be longer than Δ.

TABLE II

SYMBOL ELEMENT CATEGORIES

Symbol elements 01E through 21E have 21 elements and descriptions which are the same as for Base Stroke Categories 01B, 02B, . . ., 21B, respectively.
The following symbol elements 22E through 72E are comprised of base strokes indicated with their relative positions and crossings as depicted.

| ID | ELEMENTS | DESCRIPTION |
|---|---|---|
| 22E | △ ⌊ | $(33B)_1 \& (12B/09B)_2$ |
| 23E | ⌊ ⌊ ⌊ ⌊ ⌊ | [1] $(32B/33B)_1 \& (32B/33B)_2 \& (12B)_3$ with or without one of the following two endings: (a) $\& (12B)_4 \& (12B)_5 \& (12B)_6$ (b) $\& (19B)_4 \& (08B)_5 \& (12B)_6$ or [2] $(32B/33B)_1 \& (32B/33B)_2 \&$ |

TABLE II-continued
SYMBOL ELEMENT CATEGORIES

Symbol elements 01E through 21E have 21 elements and descriptions which are the same as for Base Stroke Categories 01B, 02B, ..., 21B, respectively.
The following symbol elements 22E through 72E are comprised of base strokes indicated with their relative positions and crossings as depicted.

| ID | ELEMENTS | DESCRIPTION |
|---|---|---|
| | | $(09B)_3$ or [3] $(32B/33B)_1\&(32B/33B)_2\&(02B)_3$ |
| 24E | | $(29B/17B)_1\&(05B/12B)_2\&(02B)_3\&(20B)_4$ |
| 25E | | [1] $(12B)_1\&(18B)_2\&(11B)_3$ [2] $(12B)_1\&(39B)_2$ [3] $(18B)_1\&(10B)$ |
| 26E | | $(01B)_1\&(19B)_2\&(12B)_3$ |
| 27E | | $(01B)_1\&(25B)_2\&(13B)_3\&(04B)_4\&(12B/01B)_5\&(12B/01B/38B)_6\&(09B)_7\&(12B/01B)_8$ |
| 28E | | [1] $(09B/01B)_1\&(06B)_2\&(01B)_3\&(01B/02B)_4$ [2] $(30B)_1\&(01B)_2\&(01B/02B)_3$ |
| 29E | | [1] $(26B)_1\&(15B)_2$ [2] $(15B)_1\&(07B/04B)_2$ |
| 30E | | $(06B)_1\&(13B)_2$ and wider than tall |
| 31E | | [1] $(06B)_1\&(28B)_2\&(01B)_3\&(01B)_4\&(25B)_5\&(30B/13B)_6\&(01B)_7\&(01B)_8$ [2] $(06B)_1\&(28B)_2\&(01B)_3\&(01B)_4\&(34B)_5\&(01B)_6\&(30B/13B)_7$ [3] $(12B)_1\&(06B)_2\&(13B)_3$ |
| 32E | | $(28B)_1\&(01B)_2\&(02B)_3\&(16B)_4$ with or without following $(12B)_5$ |
| 33E | | $(08B)_1\&(11B)_2$ with gap between |
| 34E | | $(01B)_1\&(04B/19B)_2\&(38B)_3$ |
| 35E | | $(12B)_1\&(25B)_2\&(17B)_3$ |
| 36E | | [1] $(18B)_1\&(06B)_2$ [2] $(06B)_1\&(18B)_2$ |
| 37E | | $(01B)_1\&(04B/19B)_2\&(08B)_3\&(11B/12B)_4$ |
| 38E | | [1] $(32B)_1\&(32B)_2\&(32B)_3$ [2] $(08B)_1\&(05B/06B)_2\&(05B/21B)_3$ |
| 39E | | [1] $(32B)_1\&(07B)_2\&(01B)_3$ [2] $(01B)_1\&(32B)_2\&(07B)_3$ |
| 40E | | $(25B)_1\&(28B/14B/13B)_2\&(02B)_3$ |
| 41E | | $(06B)_1\&(13B)_2$ and longer than wide or as long as wide |
| 42E | | $(28B/14B)_1\&(02B)_2$ |
| 43E | | $(01B)_1\&(33B)_2$ |
| 44E | | [1] $(26B)_1\&(19B)_2\&(09B)_3$ [2] $(13B)_1\&(08B/09B)_2\&(09B)_3$ [3] $(13B)_1\&(12B)_2\&(38B)_3$ |
| 45E | | $(09B)_1\&(05B)_2$ |
| 46E | | [1] $(12B)_1\&(12B/01B)_2\&(38B)_3$ [2] $(12B)_1\&(12B)_2$ [3] $(08B/09B)_1\&(08B/09B)_2\&(09B)_3$ |
| 47E | | $(05B/19B)_1\&(08B)_2\&(11B/12B)_3$ |
| 48E | | [1] $(12B)_1\&(12B)_2\&(09B)_3$ with or without $(02B/03B)_4$ [2] $(05B)_1\&(12B)_2\&(09B)_3$ with or without $(02B/03B)_4$ |
| 49E | | $(12B)_1\&(04B)_2\&(04B)_3\&(01B)_4\&(01B)_5\&(02B/03B)_6\&(08B)_7\&(12B)_8$ |
| 50E | | [1] $(08B/25B/12B)_1\&(08B/05B/12B)_2\&(05B/12B)_3\&(12B)_4$ [2] $(12B)_1\&(08B)_2\&(09B)_3\&(11B/12B)_4$ |
| 51E | | [1] $(08B/25B)_1\&(20B)_2\&(12B)_3\&(12B)_4$ [2] $(08B)_1\&(12B)_2\&(05B)_3$ [3] $(08B)_1\&(01B)_2\&(04B)_3$ [4] $(12B)_1\&(09B)_2\&(05B)_3$ |
| 52E | | [1] $(26B)_1\&(10B)_2$ [2] $(11B)_1\&(07B)_2$ [3] $(09B)_1\&(11B/12B)_2$ |
| 53E | | [1] $(01B)_1\&(04B)_2\&(03B)_3$ [2] $(04B/26B)_1\&(01B)_2\&(03B)_3$ |
| 54E | | $(06B/08B)_1\&(13B/30B)_2\&(01B)_3\&(01B)_4$ |
| 55E | | $(09B)_1\&(06B/08B)_2\&(13B/30B)_3$ followed by: [i] $(12B)_4\&(12B)_5\&(01B)_6$ or [ii] $(12B)_4\&(01B)_5\&(12B)_6$ or [iii] $(01B)_4\&(12B)_5\&(12B)_6$ |
| 56E | | [1] $(01B)_1\&(04B)_2\&(04B)_3$ with or without $(02B/03B)_4$ [2] $(04B)_1\&(04B)_2\&(01B)_3$ with or without $(02B/03B)_4$ [3] $(01B)_1\&(04B)_2\&(01B)_3\&(04B)_4$ with or without $(02B/03B)_5$ [4] $(04B)_1\&(01B)_2\&(04B)_3\&(01B)_4$ with or without $(02B/03B)_5$ |
| 57E | | [1] $(08B)_1\&(01B/12B)_2\&(01B/12B)_3\&(08B)_4\&(01B/12B)_5\&(01B/12B/05B)_6$ [2] $(08B)_1\&(01B)_2\&(05B)_3\&(08B)_4\&(01B)_5\&(19B/05B)_6$ |
| 58E | | [1] $(01B)_1\&(21B)_2\&(07B)_3\&(12B)_4$ [2] $(21B)_1\&(07B)_2\&(12B)_3$ |
| 59E | | [1] $(12B)_1\&(03B)_2\&(12B)_3\&(02B)_4\&(25B)_5\&(13B/28B)_6\&(02B)_7$ [2] $(12B/05B)_1\&(40B/27B)_2$ |
| 60E | | [1] $(25B)_1\&(06B)_2$ with or without $(03B)_3$ [2] $(12B)_1\&(08B)_2$ with or without $(02B/03B)_3$ |
| 61E | | $(01B)_1\&(02B/03B)_2$ |
| 62E | | $(08B)_1\&(17B/29B)_2\&(08B)_3\&(11B/12B)_4$ |
| 63E | | [1] $(08B)_1\&(11B)_2\&(01B)_3\&(02B)_4\&(04B)_5\&(12B)_6\&(09B)_7\&(02B/03B)_8$ [2] $(08B)_1\&(01B)_2\&(01B/02B)_3\&(02B)_4\&(16B)_5$ |
| 64E | | $(08B)_1\&(11B)_2$ |
| 65E | | [1] $(01B)_1\&(02B/03B)_2\&(04B)_3\&(02B/03B)_4$ [2] $(01B)_1\&(04B)_2(01B)_3\&(02B/03B)_4$ |
| 66E | | [1] $(25B)_1\&(03B)_2$ [2] $(34B/35B/37B)_1\&(05B)_2$ |
| 67E | | $(25B)_1\&(01B)_2\&(17B)_3\&(08B/06B)_4\&(01B)_5\&(34B/20B)_6$ |
| 68E | | [1] $(06B)_1\&(01B)_2\&(04B)_3\&(01B)_4\&(01B)_5\&(13B)_6\&(50E)_7$ [2] $(01B)_1\&(02B)_2\&(02B)_3\&(04B)_4\&(23B)_5\&(50E)_{6-9}$ [3] $(14B/28B)_1\&(23B)_2\&(01B)_3$ |
| 69E | | [1] $(09B)_1\&(06B)_2\&(14B/28B)_3\&(01B)_4\&(02B)_5\&(02B)_6\&(13B)_7$ with or without $(50E)_{8-11}$ [2] $(08B)_1\&(13B)_2\&(12B)_3\&(23B)_4$ with or without $(01B)_5$ |
| 70E | | $(13B/14B)_1\&(10B)_2$ |
| 71E | | [1] $(25B)_1\&(01B)_2$ [2] $(01B)_1\&(25B)_2$ |

TABLE II-continued

SYMBOL ELEMENT CATEGORIES

Symbol elements 01E through 21E have 21 elements and descriptions which are the same as for Base Stroke Categories 01B, 02B, ..., 21B, respectively. The following symbol elements 22E through 72E are comprised of base strokes indicated with their relative positions and crossings as depicted.

| ID | ELEMENTS | DESCRIPTION |
|---|---|---|
| 72E | ╎- | [1] $(01B)_1 \& (04B)_2$ <br> [2] $(04B)_1 \& (01B)_2$ |

Symbol Recognition Output Table

The symbol recognition output table 22 provides word identification in the form of digital codes that represent each of the symbols that have been included in the repertoire, or "lexicon" of the system. The precise values that are used for these codes are not very significant. The basic requirement is that they correspond to the coding scheme of the input/output device, such as a printer or display 40, that receives the output. The digital values for the output codes are stored in the symbol recognition output table 22. When the recognition logic has completed the analysis of the input signals for a Kanji/Chinese symbol, the sequence of symbol elements that were detected is received on lines 38 and used to search this table for the digital code that represents the symbol that was written. In most cases, there will be more than one sequence of symbol elements for each digital code. These correspond to acceptable alternative writings of the symbol. If it is desired to relax the constraints for writing a particular symbol, an alternative sequence is selected that accepts the desired writing variation but is not similar to another symbol. This sequence is then used as another access to the appropriate digital code.

Figure 2:
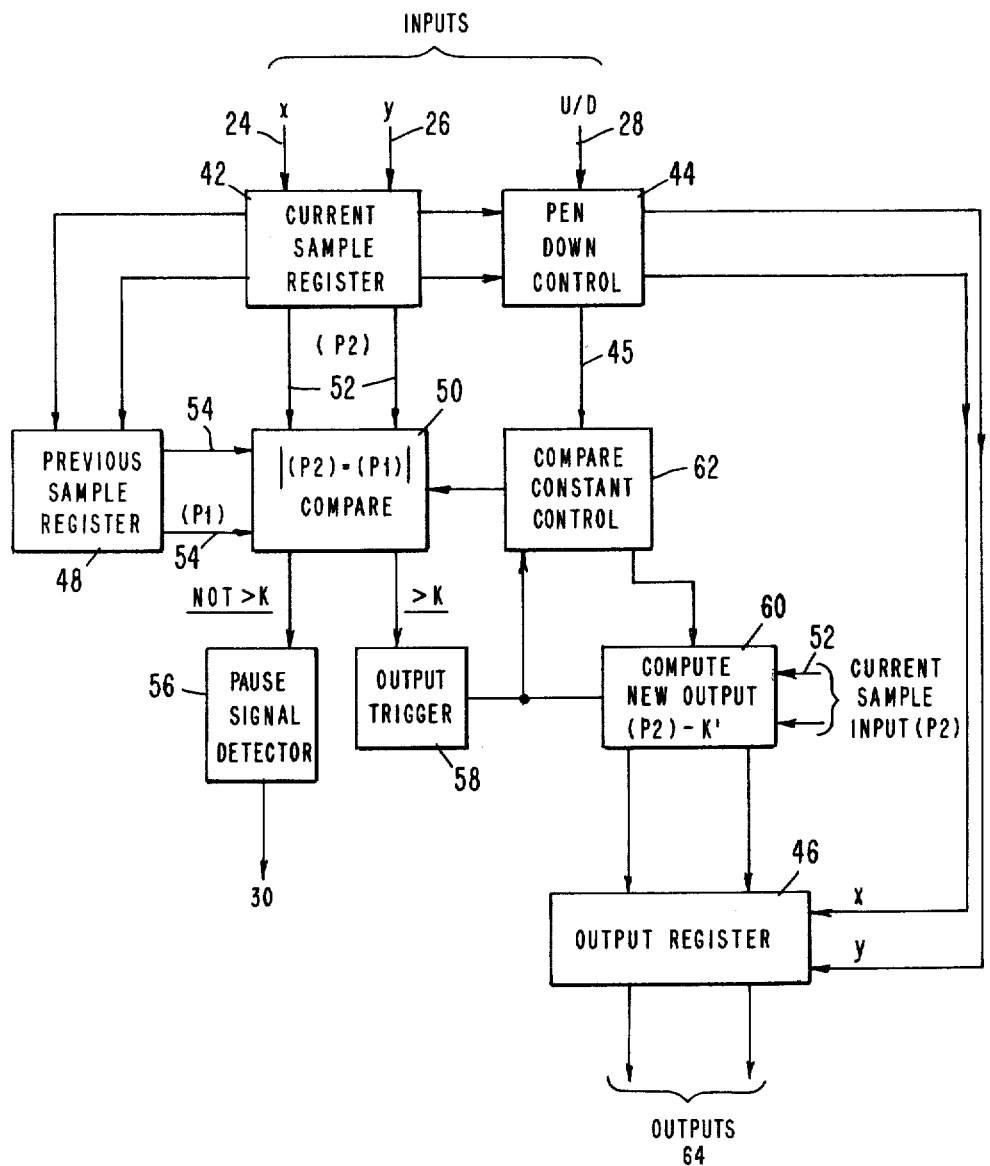
FIG. 2 is a circuit block diagram of the signal filter unit.

FIG. 2 contains a circuit block diagram of the signal filtering operation performed in the signal filter and segment integration unit 16. The sample coordinates and the pen down signal is on lines 24, 26, and 28 are passed from the tablet electronics 10 to the processor which is micro-coded to perform the filter operations as shown in FIG. 2. The most recent pen position sample is stored in a current sample register 42. If this is the first sample of a pen down period, a pen down control 44 passes these coordinates to an output register 46. The pen down control 44 is, therefore, a gate function wherein the pen down condition which requires, via line 45, selection of a larger value of constant for comparison. When subsequent samples occur, the values for x and y in the current sample register 42 are moved into a previous sample register 48 and the new values are stored in the current register 42. The absolute difference between the current sample (P2) on lines 52 and the previous sample (P1) is compared to a constant K to determine if $$|X(2) - X(1)| > K$$

or $$|Y(2) - Y(1)| > K$$

where K is a constant that corresponds to the maximum random fluctuations in the pen position signals. These comparisons are made after each new sample is created by the tablet 14. When neither of these conditions is satisfied, the motion of the pen between sample times is negligible and the output of the (P2)−(P1) compare unit 50 causes a pause signal to be created by a detector 56 and passed on line 30 to the base stroke classification unit 18 where it is used in the classification of base stroke shapes.

If either or both of the preceding differences exceeds the constant K, an output trigger 58 causes a new position value to be calculated and passed into the output register 46 by a compute new output unit 60. If the x motion exceeds the threshold and the current x value is greater than the previous x value, the new value of x is $$X\text{new} = X(2) - K'$$

where K' is another constant that is approximately one half K.

If the x motion exceeds the threshold and the current x value is less than the previous x value, the new value of x is $$X\text{new} = X(2) + K'$$

If the y motion exceeds the threshold and the current y value is greater than the previous y value, the new value of y is $$Y\text{new} = Y(2) - K'$$

If the y motion exceeds the threshold and the current y value is less than the previous y value, the new value of y is $$Y\text{new} = Y(2) + K'$$

After the first point has occurred beyond the pen down position, the constant that is used by the (P2)−(P1) compare unit 50 for the comparison of successive points is changed to a smaller value by a compare constant control unit 62.

The series of x and y values that appear in the output register 46 and on its output line 64 constitute the output signals of the filter operation. The x and Y signals on lines 64 and the pause signals on line 30 are passed on to the line segment integration operation, shown in FIG. 3.

Figure 3:
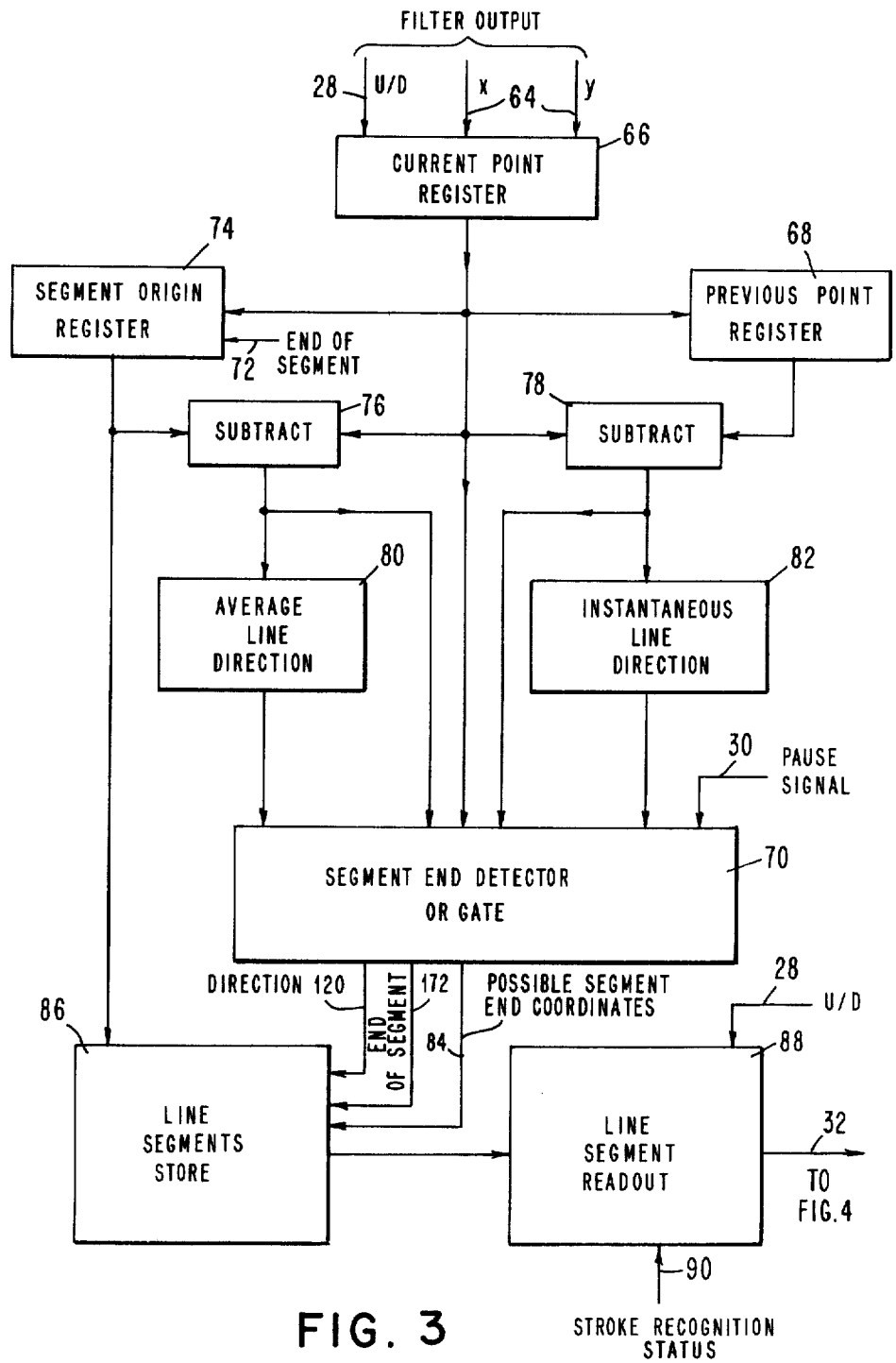
FIG. 3 is a circuit block diagram of the line segment integration unit.

FIG. 3 is a logic block diagram of the line segment integration unit indicated as part of block 16 in FIG. 1. This operation determines the beginning and end points of each stroke and the sequence of line elements that characterize each stroke. These outputs are then used by the stroke recognition logic to determine the appropriate base stroke category.

The coordinates of each successive point during pen down periods are stored in a current point register 66. If the point is the first sample from the filter after a pen down, a flag is added to the coordinates to identify them as the line beginning. For subsequent line beginnings the same flag also serves to indicate that the preceding point was a line end. When the coordinates for the next sample point are received from the filter operation, the current point, with the line end flag, is moved into a previous point register 68 and the new point is stored in the current point register 66. When the new point is the beginning of a new line segment, as indicated by an output 72 from a segment end detector 70, its coordinates are also stored in a segment origin register 74.

The current point register 66 coordinates are subtracted by subtractors 76 and 78 from the coordinates in both the segment origin register 74 and the previous point register 68. These two sets of differences are used to compute two angles that represent the line direction. The angle for the difference between the current point coordinates and the segment origin determines the average direction 80 of the segment. The angle for the difference between the current point coordinates and the previous point determines the instantaneous direction 82 of the line. The following ratio is used to determine these angles:

$$\frac{Y(n+1) - Y(n)}{X(n+1) - X(n)} = \text{Tan } B$$

When the tangent of B corresponds to an angle that is in the range of approximately −22.5 to +22.5 degrees, the angle for the direction of motion is classified as East. If the angle is in the range of +22.5 to +67.5 degrees, it is classified as northeast. If it is in the range of 67.5 to +112.5 degrees, it is north. All eight compass directions are determined in a similar manner. The precise size and orientation of these angular measures are adjusted to enhance the discrimination of significant shapes of Kanji/Chinese line strokes.

The values in 82 and 80 for both the instantaneous and average line directions are examined by the segment end detector 70 to determine the end of each line segment. In addition to the line directions, the segment end detector 70 also examines the distance between the current point and the segment origin, the distance between the current point and the previous point, and the occurrence of a pause signal on line 30 of line direction output 80 as the line motion proceeds. A segment end occurs when the direction changes from one category to another.

The coordinates of the segment end on line 84 are taken to be the coordinates of the last point before the line motion exceeded the direction tolerance for the previous direction. The coordinates for the end of the segment are also the coordinates for the origin of the following segment.

The segment end detector 70 also compares the instantaneous 82 and the average line 80 directions after every point. If they differ to a significant degree, a possible segment end is noted and the current position is stored pending the analysis of subsequent data. In certain selected cases, such as when the line has been moving south and then moves east, west, northeast or northwest, a line segment end can occur without having a change in the average line direction. This can occur when the instantaneous direction changes abruptly and it is signified when a pause signal occurs, or when the distance between the current point and the provisional end is relatively large compared to the distance between the current point and the segment origin. The definition of these selected cases are tailor made to cope with the specific shapes of the strokes in Kanji/Chinese symbols.

When a segment end occurs, the segment direction and the segment end point coordinates 84 are shifted into a line segments store register 86. As each successive segment is detected, its end points and direction are positioned in the line segment store 86 adjacent to the preceding segment. When the line stroke is completed, the pen up signal on line 28 from the filter operation initiates a line segment read out 88. This read out operation presents the line segments to the base stroke classification unit 18 via line 32. If the sequence of directions and segment intervals satisfy one of the 42 base stroke patterns, a recognition occurs and the segment sequence is passed on to the symbol element recognition unit 20. If a base stroke recognition does not occur, a signal is fed back as a stroke recognition status indicator on line 90 to the line segment read out 88. The read out operation is then modified to cause the smallest segments to merge with their preceding neighbor. The revised sequence of segments is also presented to the base stroke classification unit 18. If the base stroke recognition fails again, the read out status on line 90 is modified again to merge somewhat longer segments with their preceding neighbor. Alternatively, the small segments could be merged with the subsequent segment. However, the practical effect is equivalent. If the recognition logic is not satisfied a third time, the stroke is rejected. After the line segments for a stroke have been read out and recognized, or read out and rejected, as signified by the stroke recognition status signal, the segments for that stroke are erased from the line segments store.

Table III contains a listing of the twenty-three (23) statements or conditions used in the segment end detector 70 shown in FIG. 3 as criteria for detecting an end of segment. Also, FIG. 7 is a logic block diagram of the circuits used in the line segment integration unit of FIG. 3 to provide the logic compare operations. More particularly, each of the 23 segment end conditions listed in the Table III corresponds with the pressure of certain pause, average line direction, instantaneous line direction, $\Delta$ previous point, and $\Delta$ segment origin conditions indicated by line 30 and devices 80, 82, 78, and 76 in FIG. 7. For example, the first end of segment condition is detected if there exists an average line direction of east, and the instantaneous line direction is not east, and the absolute value of the change in the y coordinate previous point is greater than one (1). These conditions are inputted to the AND gate 1 indicated by numeral 270a. The twenty-third end segment condition listed in the Table III is detected in the AND gate 23 indicated by numeral 270w in FIG. 7.

In Table III, the $\Delta$(previous) refers to the subtraction from the present point to the previous point and is indicated by the subtract lock 78 in both FIGS. 3 and 7. The $\Delta$(origin) refers to the subtraction block 76 from the present point to the origins of the segments. Also, the asterisk (*) means "don't care" or simply means that the input is not used. Also, in the table, it is known that $\Delta y > 0$ in the southerly direction, and $\Delta x > 0$ in the easterly direction.

Each line condition in Table III produces a respective AND gate applied to an OR-gate 272 to provide an end of segment output on line 172. As described above with reference to FIG. 3, the end of segment line 172 is connected to the line segments store 86.

FIG. 7 also shows the derivation of the possible segment end coordinates on line 84 out of the segment end detector 70. Specifically, a comparator 274 is used to determine when the average line direction from 80 does not equal the instantaneous line direction from 82 and indicates this on line 276 applied to the input of a gate 278. When this condition occurs, the gate 278 will pass the coordinates from the current point register 66 as the possible segment end coordinates on line 84 into the line segments store 86. In this fashion, the possible segment end coordinates are determined and stored.

TABLE III

END SEGMENT LOGIC

| PAUSE | AVG. LINE DIREC. | INSTANT. LINE DIREC. | (Δ(PREVIOUS)) (Δ(ORIGIN)) |
|---|---|---|---|
| * | E | ≠E | abs{Δy(prev)}>1 |
| * | E | ≠E | −Δx(prev)>1 |
| prev. pause | E | ≠E | abs{Δy(prev)}>0 |
| * | SE | ≠SE | Δy(prev)<0 |
| * | SE | ≠SE | Δx(prev)<−1 |
| * | SE | ≠SE | Δx(prev)>4 |
| * | SE | ≠SE | Δy(prev)>Δx(ORIG)−4 |
| * | S | ≠SE | −Δy(prev)>1 |
| * | S | ≠S | abs{Δx(prev)}>1 & Δy(prev)≦0 |
| prev. pause | S | ≠S | abs{Δx(prev)}>0 |
| * | S | E & prev. instant. line dir. = W | |
| * | SW | ≠SW | Δx(prev)<−2 & Δy(prev)<1 |
| * | SW | ≠SW | Δy(prev)<−2 |
| * | SW | ≠SW | Δx(prev)>0 |
| * | SW | W | Δy(prev)<0 |
| * | SW | NW | * |
| * | SW | S | Δy(prev)>4 |
| * | W | ≠SW | Δx(prev)>0 |
| * | NW | ≠NW | abs{Δx(prev)}>1 |
| * | NW | ≠NW | abs{Δy(prev)}>1 |
| * | N | | |
| * | NE | ≠NE | Δy(prev)>1 |
| * | NE | ≠NE | abs{Δy(prev)}>2*(abs{Δx(prev)}+0.7) |

Base Stroke Classification

Figure 4:
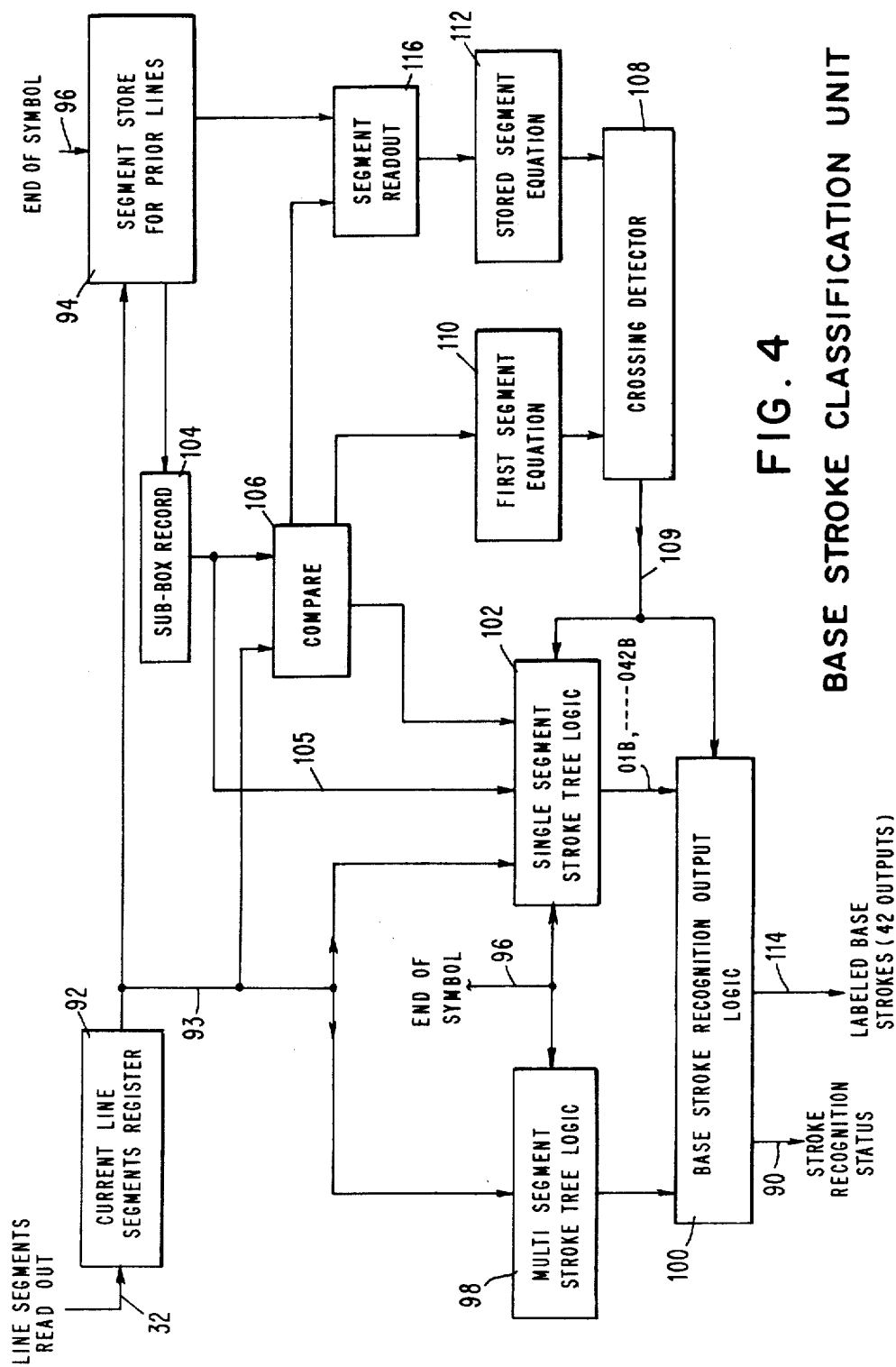
FIG. 4 is a circuit block diagram of the base stroke classification unit.

FIG. 4 contains the block diagram for base stroke classification unit 18. The output 32 of the line segments read out 88 in FIG. 3 for each stroke is passed into a current line segments register 92 where it is held until the base stroke analysis is completed. Afterward, the line segments for each stroke are passed into a segment store 94 for prior lines, where all segments for an entire symbol are retained until the symbol recognition is completed and an end of symbol signal 96 erases the stored line segments. An end of symbol signal 96 is created when the writer has finished writing and has moved the pen beyond the area that is allocated for that symbol. When an end of symbol signal occurs, it is also passed into the base stroke classification unit 18. The unit 18 appends an end of symbol code to the sequence of base strokes which are passed on to subsequent recognition operations.

Base stroke recognition falls into two classes: single segment strokes and multi-segment strokes. The multi-segment (multi-direction) strokes are classified by a logic tree 98 analysis as shown in detail in FIGS. 12-17 to be described in detail below. This analysis begins with the placement of the first line segment into one of four major categories. These are: east, south, southeast and southwest. Some tolerance is provided in the east category to also accept strokes that begin with a northest segment. The tree logic for each shape propagates through one node for each segment in that shape. The logic at each node can include conditions for the relative length of segments as well as conditions for direction. Base stroke recognition occurs in the recognition output logic 100 when the sequence of segments propagates through a branch of the logic to an output node. The propagation along a branch of the logic can be terminated for one of two reasons: first, the next segment that occurs at a particular node might not satisfy any of the conditions required to propagate further from that node; and second, the sequence of segments might end before the end of the branch is reached. If the sequence of segments fails to reach an output node by the time the last segment has occurred, the base stroke recognition output logic 100 produces a stroke recognition status signal 90 which initiates the merger of small segments in the line segment read out function 88 of FIG. 3. The general shape requirement for all base stroke categories is included in Table 1 described above.

The classification of strokes that have a single segment is based upon direction, length and, in some cases, position relative to prior strokes of the symbol. The single segment strokes are classified by a stroke tree logic 102 as shown in detail in FIGS. 8-11. The relative position of a stroke to prior strokes is characterized by creating a rectangular "sub-box" that encloses all of the preceding strokes from segment store 94 in FIG. 4. As each new stroke occurs, an update is made to the maximum and minimum values that are stored in a sub-box record 104 connected to segment store 94. In this record 104, the maximum value of y defines the lower edge of the sub-box, the maximum value of x defines the right edge of the sub-box, the minimum value of y defines the upper edge of the sub-box, and the minimum value of x defines the left edge of the sub-box. When a new line is written, the extreme values of x and y are compared by comparator 106 with the sub-box to determine the line's relative position to that portion of the symbol. The base stroke descriptions in Table 1 indicate the relative position conditions required for classification of some base strokes.

The classification of strokes that have a single segment also depends upon essential crossing information. Crossing information influences the base stroke output in two ways. The base stroke category selection for certain single segment strokes is determined by crossing information provided in part by a crossing detector 108 to the base stroke recognition output logic 100. Each stroke that is crossed by a subsequent stroke is given an extra label. With one exception, the crossing label is attached to the stroke that was written first. The exception occurs when one of the strokes that crosses another stroke is a horizontal line. Then the label is attached to the horizontal line. This determination is made in the base stroke recognition output logic 100.

Stroke crossings are detected by first comparing the edges of the sub-box with the line segment end points of the current stroke. If none of the segment end points fall within the sub-box, a crossing cannot occur and the analysis is complete. If the comparator 106 of FIG. 4 finds that the stroke overlaps the sub-box, an analysis is made for a possible intersection between the first segment of the current stroke and each of the segments of all the preceding strokes of the symbol. The end points of the first segment of the current stroke are passed to a first segment equation unit 110 which computes the straight line that joins these end points. The end points for each segment of the prior lines are passed, in turn, to a stored segment equation unit 112 via a segment read-out 116. Points of intersection between the first segment of the current stroke and each of the previous segments are then determined algebraically. If the coordinates of these intersection points fall between the maximum and minimum points for x and y of both segments, a crossing is detected by the crossing detector 108 and an appropriate input is passed to the base stroke recognition logic 100. This unit makes the appropriate modifications to the base stroke category and labels the strokes that have been crossed accordingly on its output line 114.

FIGS. 8–11 show the detailed logic diagrams for the single segment stroke tree logic 102 in FIG. 4. As mentioned above, the classification of strokes that have a single segment is based upon direction, length, and, in some cases, position relative to prior strokes of the symbol. The relative position of a stroke to prior strokes is characterized by creating a rectangular sub-box that encloses all of the preceding strokes. A sub-box is a part of a box, or another sub-box, formed by:

(a) drawing an imaginary horizontal (vertical) line, which extends from the left (top) edge of the sub-box to the right (bottom) edge of the sub-box, without cutting any of the strokes in the Kanji character; and (b) the same as in step (a) above, except that there is allowed the imaginary horizontal (vertical) line which extends from one edge of the box to another, to cut one or two single stroke alphabet symbols.

In FIGS. 8–17, the logic gating devices or triggers are shown as blocks indicated by T1 through T40, AND gates are indicated by a "A", OR gates are indicated by "OR", and comparator devices are indicated by "COMP".

FIG. 1 provides the logic diagrams for determining the single segment strokes identified with the ID O1B, O2B, and O3B listed in Table I above. A direction line 120 derived in the segment end detector 70 of the line segment integration unit 16 shown in FIG. 3 provides direction signals to several of the triggers, such as T1. Also, pen-up and pen-down signals on line 28 out of the tablet electronics 10 are applied to these triggers. In FIG. 8, when an east segment is determined by the segment end detector 70 on its output line 120, and a pen-down motion has been signaled on line 28 at the start of the stroke, a trigger T1 is set. In the FIGS., the pen-down signal is indicated by the line 28d while the pen-up signal is indicated by the line 28u even though such lines are indicated in FIGS. 1, 2, and 3 by the combined up/down line 28. When the pen goes up, the signal on line 28u together with the output signal on line 122 from the trigger T1 cause an AND gate 124 to provide an output on line 126 indicating that there has been a one segment stroke and its direction is east.

As described above, the terms $X_{min}$ and $Y_{min}$ respectively mean the minimum X and Y coordinates of either a segment or a sub-box defining the right and left edges of a sub-box or the upper and lower edges of a sub-box, as well as the ends of a segment. A sub-box is created that encloses all of the preceding strokes as you are writing the strokes and is defined by the maximum and minimum rectangular boundaries that enclose the strokes. In FIG. 8, a comparator 128 makes a comparison of the $Y_{min}$ (segment) $< Y_{max}$ (sub-box) $-\Delta_1$. This means that the one segment easterly stroke is not at the bottom of its sub-box. The symbol $\Delta_1$ is a calculated constant which is a function of the size of the sub-box and the resolution of the tablet. The $\Delta$ sets the parameter up to define if it is qualitatively the O1B stroke that is defined in Table I above. That is, the comparison at 128 for the stroke O1B indicates that it is a one segment stroke in the easterly direction and it is not at the bottom of its sub-box. When the comparison is met in comparator 128, the line 130 indicates that it is a O1B stroke. On the other hand, if the comparison fails, then a further comparison is made via line 132 in a comparator 134 which, as shown on line 136, tests the X minimums and X maximums of both the segments and the sub-boxes in order to determine via line 136 whether it is the stroke defined in Table I as O2B. The equation shown in FIG. 8 above the line 136 requires that for a O2B stroke, the X dimensions of the segment must be at the bottom of its sub-box and must not protrude horizontally from either side from the bottom of the sub-box. If the equation on line 136 is not met and the stroke is, therefore, not the O2B stroke, then the comparator 134 indicates on line 138 that the stroke must be an O3B stroke defined in Table I which states that it is an easterly stroke at the bottom of its sub-box and it horizontally protrudes therefrom.

Figures 9, 11:
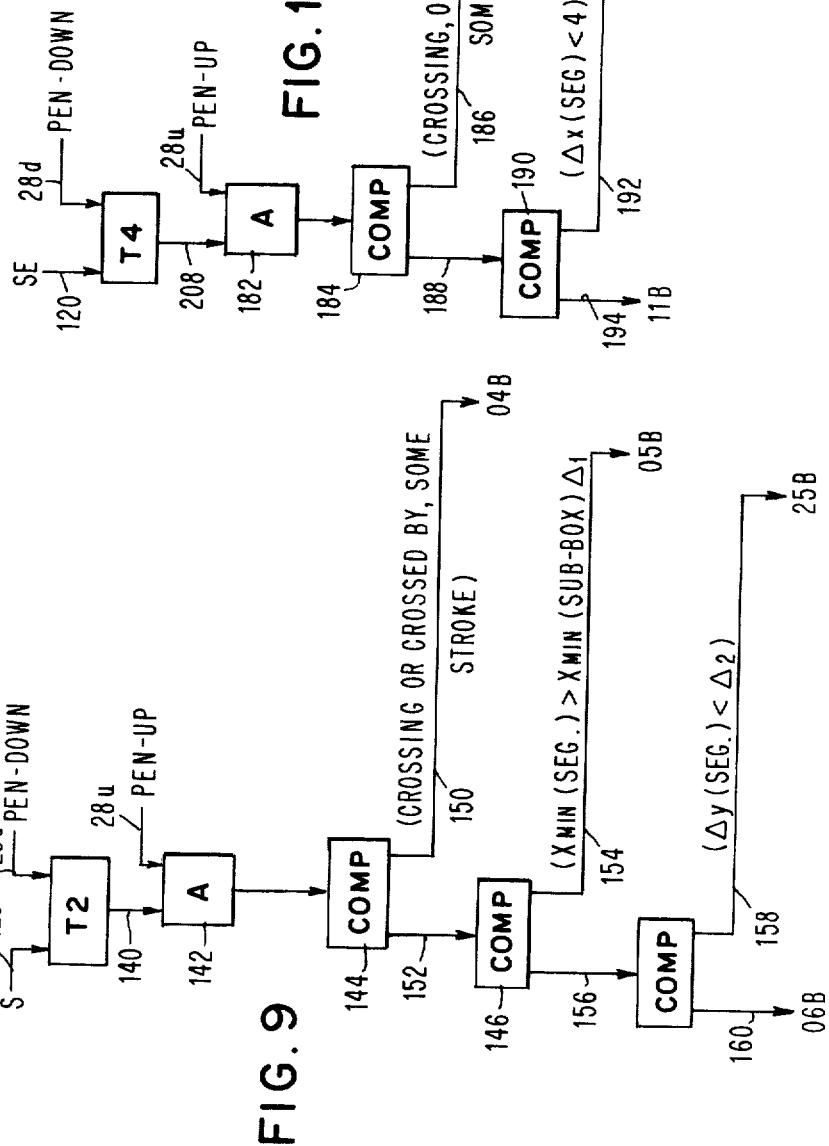

FIG. 9 shows the single segment stroke logic associated with the strokes O4B, O5B, O6B and 25B described in Table I. Here, in order to set the trigger T2, there is required both a pen-down stroke on line 28d as well as a direction signal on line 120 from the segment end detector 70 indicating that the stroke is in the South direction to provide a trigger signal on line 140 to an AND gate 142. After the pen-up signal is provided on line 28u, either some or all of comparators 144, 146, and 148 are used to determine the stroke identity. Comparator 144 determines if the stroke is crossing, or has been crossed by some stroke and is, therefore, identified on line 150 as the stroke O4B in Table I. If the conditions on line 150 are not met, then the comparator 144 sets up via line 152 another comparison in comparator 146 which determines the conditions shown above line 154 for identifying the stroke O5B. If stroke O5B is not identified, then a signal on line 156 sets up the comparator 148 for defining either the stroke 25B on line 158 or the stroke O6B on line 160.

Referring to FIG. 10, there is shown the single segment stroke logic diagrams for identifying the base strokes O7B, O8B, O9B, and 26B since here, the direction line 120 indicates a southwest direction, and the pen-down signal occurs on line 28d, to set the trigger T3 which, when a pen-up signal occurs on line 28u, will cause an AND gate 162 to provide an output to comparator 164. If the stroke is crossing, or crossed by, some stroke, then a signal on line 166 will cause a comparator 168 to determine if the stroke is crossing some stroke whereby the stroke O7B will be determined via line 170. If the stroke is crossed by some stroke, then the line 172 will indicate the identification of the stroke 26B. If the stroke is neither crossing, nor crossed by, some stroke, then a signal on line 174 will activate a comparator 176 to either identify the base stroke O8B on line 178 or the stroke O9B on line 180. It is noted that the base stroke equation determined by the comparator 176 and shown above the line 178 refers to "ensuing strokes" or following strokes which refers to the stroke that follows the current stroke. This logic is provided in the base stroke recognition output logic 100 shown in FIG. 4.

Referring to FIG. 11, there is shown the single segment stroke logic for identifying the strokes 10B, 11B, and 12B. These strokes comprise a southeast direction as indicated by the direction line 120 into the trigger T4. After the pen-up signal follows the pen-down signal, an AND gate 182 provides a signal to activate a comparator 184. If the stroke is crossing, or crossed by, some stroke, then the equation shown above line 186 is satisfied and the stroke 10B is identified. On the other hand, if the equation is not satisfied, then a signal on line 188 will activate the comparator 190 for determining whether the equation shown above line 192 has identified the stroke 12B. If such comparison is not made, then the comparator 190 indicates on line 192 that the stroke 11B is identified.

Figure 12:
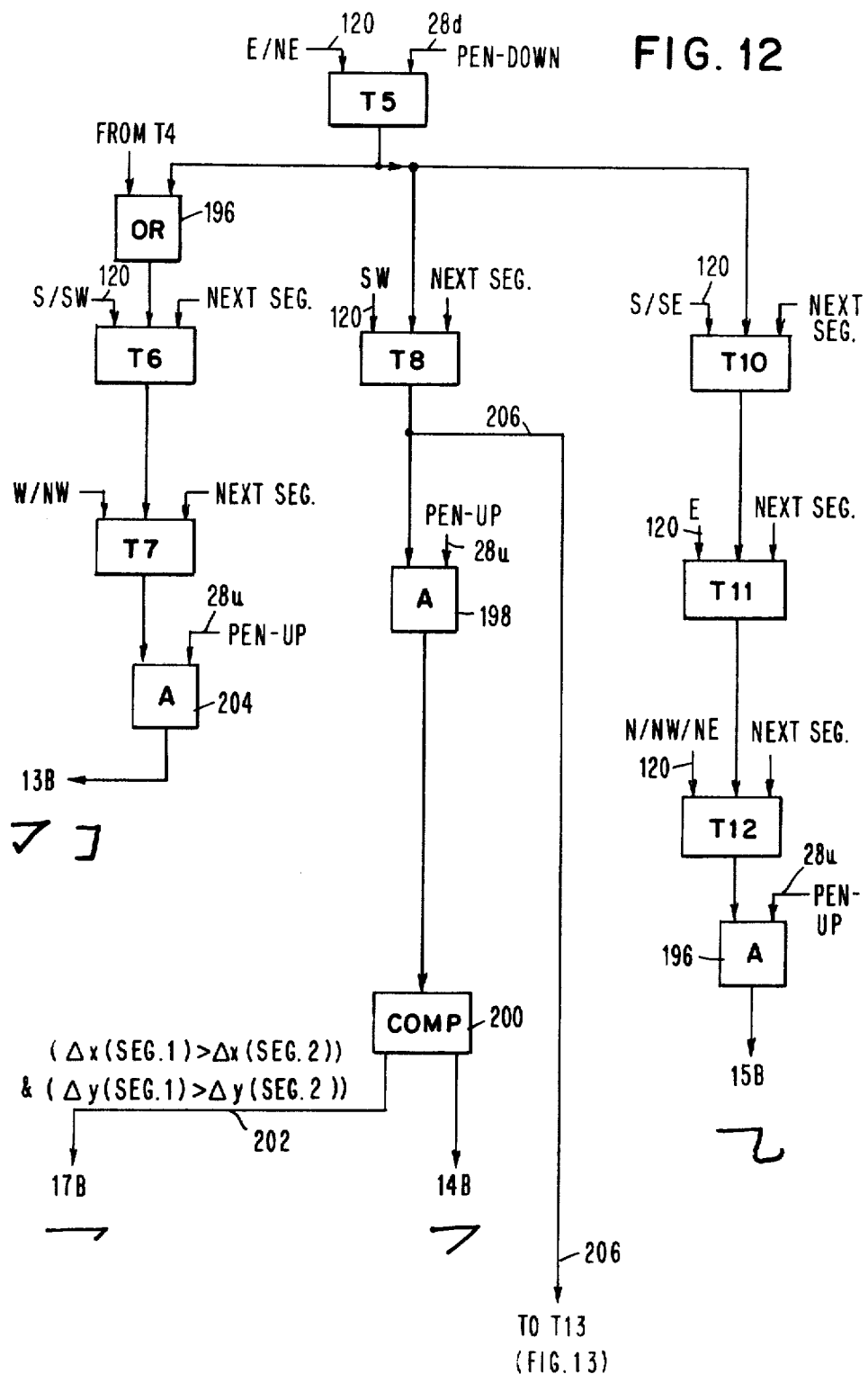
FIGS. 12-18 show the multi-segment stroke tree logic for the base stroke recognition shown in FIG. 4.

FIGS. 12-18 show the multi-segment stroke tree logic 98 for the base stroke recognition shown in general block diagram form in FIG. 4. If an east or northeast (E/NE) direction is indicated on direction line 120 after the pen-down signal is provided on line 28d, the trigger T5 is activated to provide an output signal on line 194 to an OR gate 196, a trigger T8 and a trigger T10. It is noted that several direction lines referring to different directions are indicated in the FIGS. 12-18. In order to explain the stroke tree logic diagrams in the most simple fashion, it is to be noted that the direction lines emanate from the direction line 120 shown in FIG. 3 out of the segment end detector 70. While these directions are indicated by a single direction line 120, it should be understood that several lines can be used, each providing an output when its respective direction is detected, such as a separate output line for the southwest direction, another line for the northeast direction, etc. In FIG. 12, the logic for the strokes identified as strokes 13B, 14B, 15B, and 17B shown in Table I are provided. Briefly, if the conditions are made to activate the triggers T5 and T8, then the strokes 14B or 17B are identified. If the directions are indicated for activating the triggers T5, T6, and T7, then the stroke 13B is identified. If the stroke directions exist for activating the triggers T5, T10, T11, and T12, then the stroke 15B is identified. It is noted that the directions of the multi-segment strokes are shown in the Table I with the subscripts 1, 2, 3, etc. to identify the different segments. Thus, referring to the multi-segment stroke 15B, the first segment of east or northeast will activate trigger T5, the second segment of south or southeast will activate trigger T10, the third segment in the easterly direction will activate trigger T11, and the fourth or next segment in the north or northwest or northeast directions will activate the trigger T12 and, after the pen goes up, the AND gate 196 will provide the identification of the multi-segment stroke 15B.

Similarly, the multi-segment strokes 14B and 17B are identified after the triggers T5 and T8 have been set by the first two segments and the AND gate 198 is set when the pen goes up. A comparator 200 will compare the segment logic in the equation shown above the line 202 in order to determine if the conditions are met to define the multi-segment stroke 17B or the stroke 14B.

If the directions of the segments shown for the triggers T5, T6, and T7 are met, and the pen has been raised, an AND gate 204 provides an output to identify the multi-segment stroke 13B. It is noted that all of the triggers shown act like AND gates and these triggers are turned off automatically after two segments.

Figure 13:
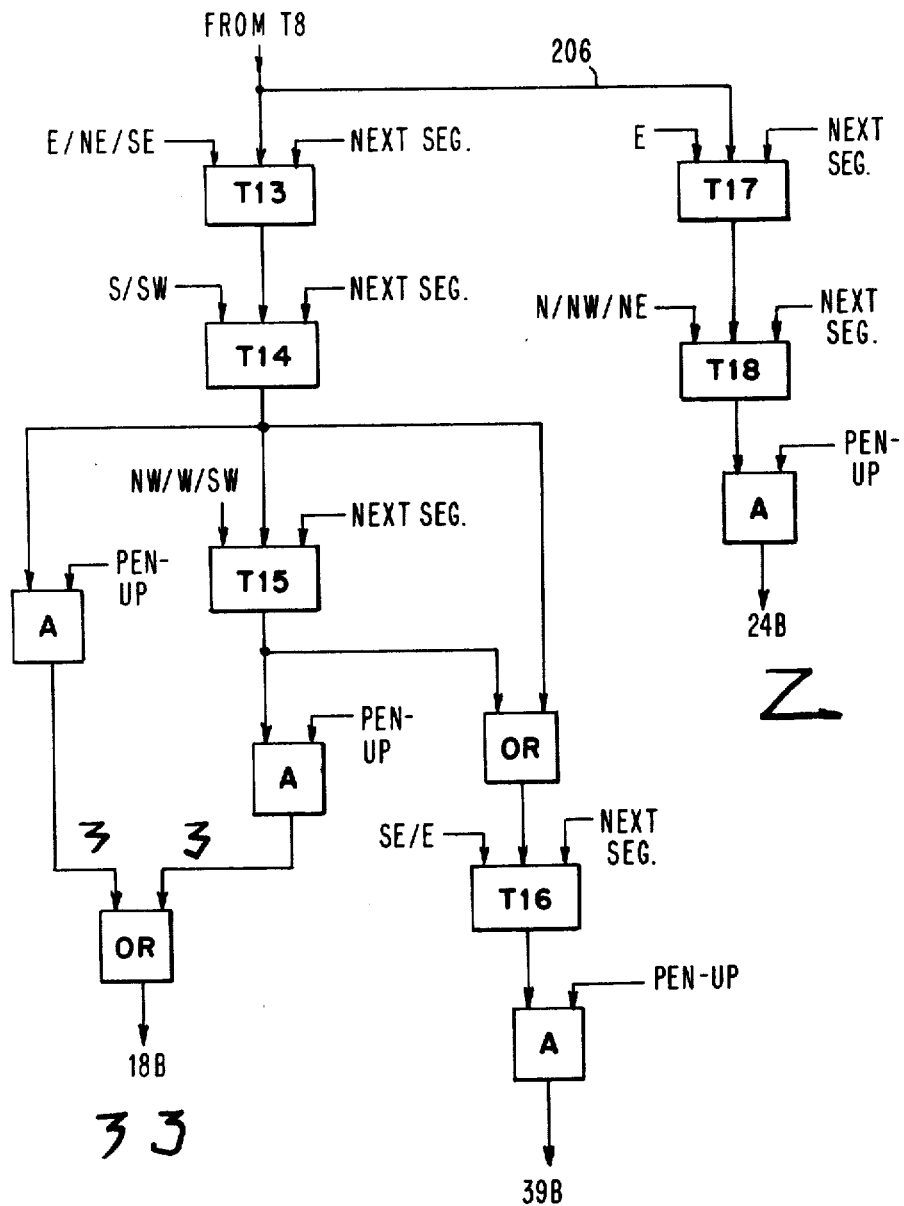
Figure 14:
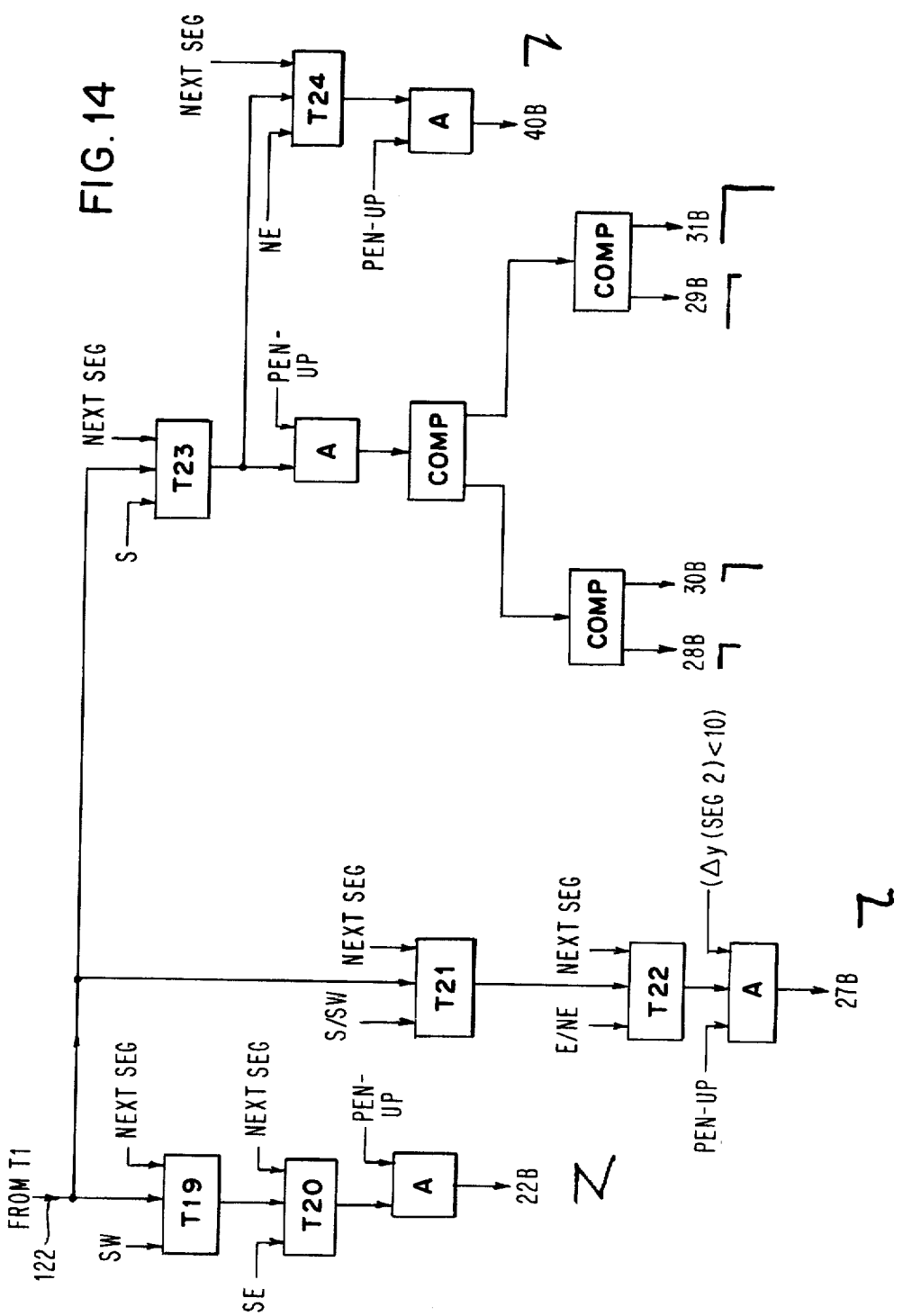

FIG. 13 shows the multi-segment stroke tree logic for identifying the strokes 18B, 24B, and 39B. Since the logic diagrams are similar to those shown in the previous FIGS., a detailed description will not be provided for these figures. It should be obvious that the triggers and gates shown operate with the direction signals and the next segment indicated to provide identification of those strokes described in Table I. In FIG. 13, it is noted that the input line 206 to the triggers T13 and T17 comes from the output of trigger T8 shown in FIG. 12 and is used together with the direction lines and the next segment output shown in order to set these triggers.

Referring to FIG. 4, there is shown the multi-segment stroke tree logic for identifying the strokes 22B, 27B, 28B, 29B, 30B, 31B, and 40B. Each of these strokes initially requires an east segment which is provided by the output line 122 from the trigger T1 shown in FIG. 8. Since the trigger logic and gating shown here should be apparent from the description of each of these strokes shown in the Table I, no further description is believed necessary.

Figure 15:
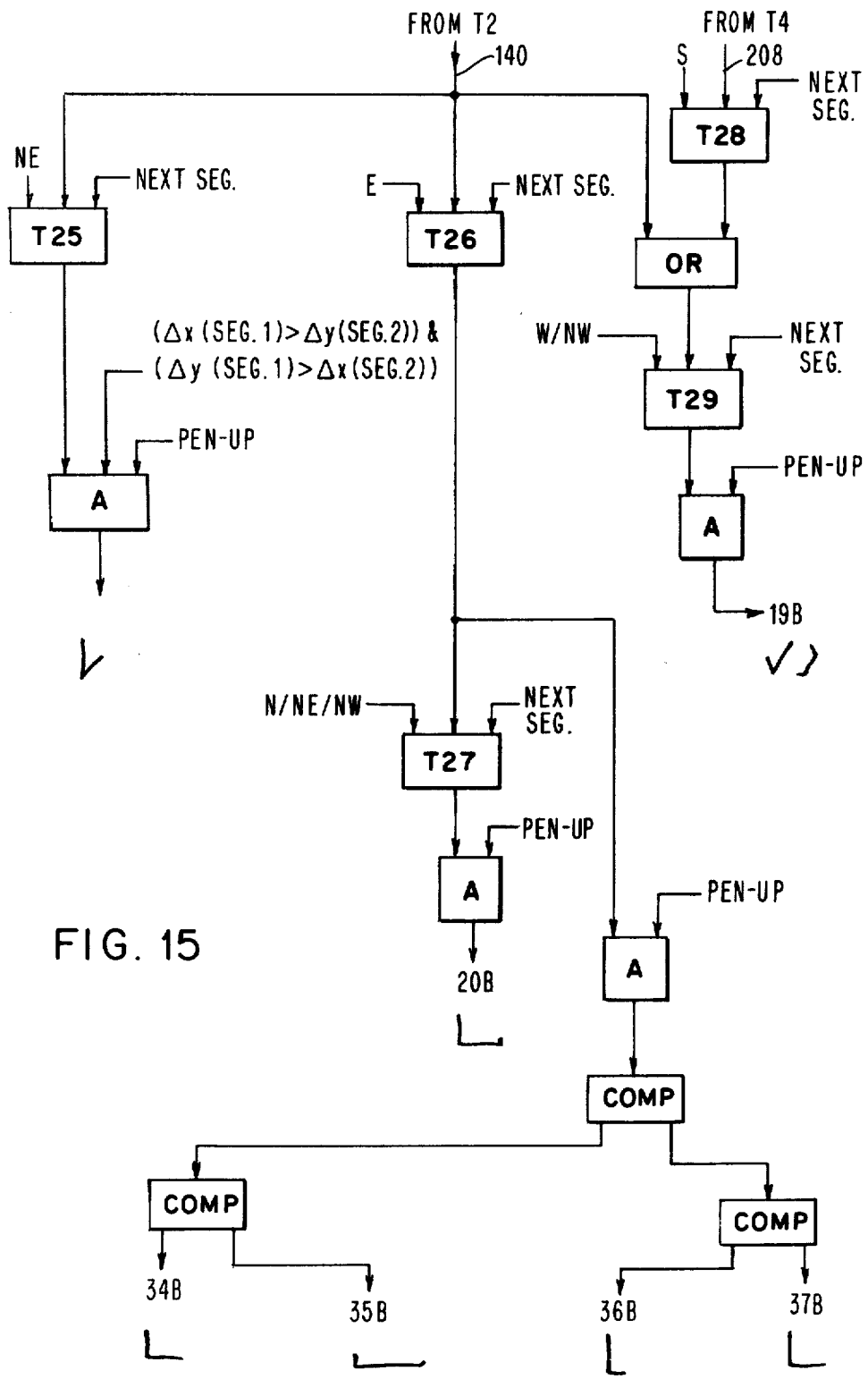

Referring to FIG. 15, there is shown a multi-segment stroke tree logic for identifying the strokes 16B, 19B, 20B, 34B, 35B, 36B, and 37B. Initially, these strokes are identified by the first segment being in the south or southeast directions as indicated by the output line 140 from the trigger T2 shown in FIG. 9 or the output line 208 from the trigger T4 shown in FIG. 11.

Figure 16:
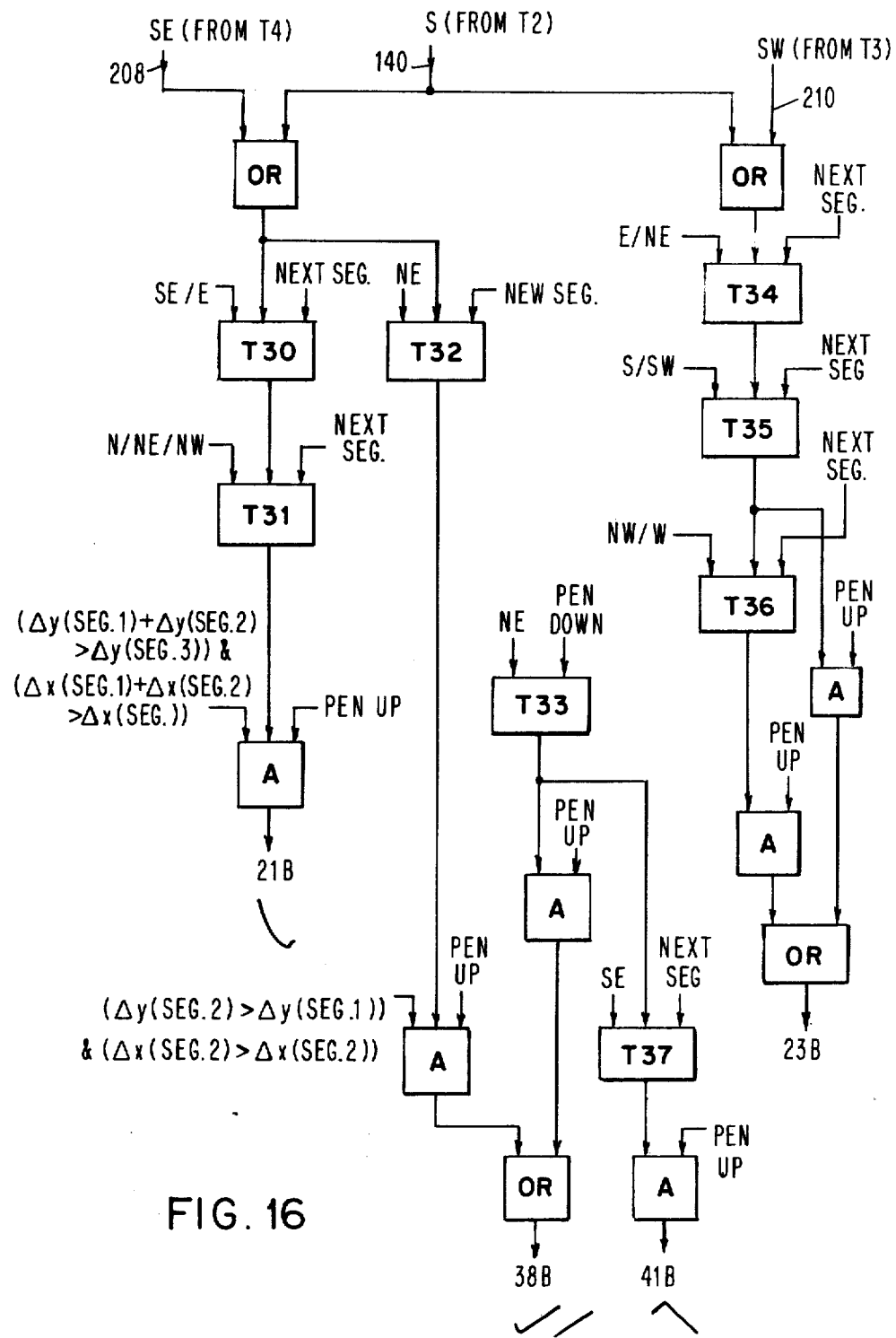

Referring to FIG. 16, there is shown the multi-segment stroke tree logic for identifying the strokes 21B, 23B, 38B, and 41B. Here, the initial segments required for gating and triggering have either a southeast direction indicated by line 208 out of the trigger T4, a south direction indicated by line 140 out of the trigger T2, or a southwest direction indicated by the line 210 out of the trigger T3 shown in FIG. 10.

Figure 17:
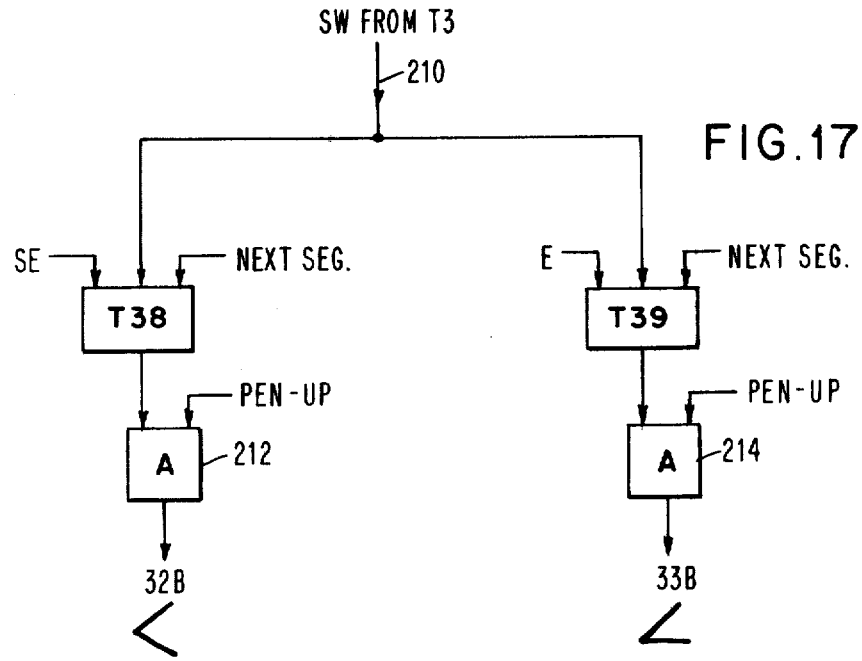

Referring to FIG. 17, there is shown the multi-segment stroke three logic for identifying the strokes 32B and 33B. Here, the triggers T38 and T39 require an initial southwest stroke direction indicated by the output line 210 from the trigger T3 shown in FIG. 10. If the next segment is in the southeast direction, the trigger T38 is set and the AND gate 212 will indicate the stroke 32B. Also, if the second segment is in the east direction, the trigger T39 is set and an AND gate 214 will identify the stroke 33B.

Figure 18:
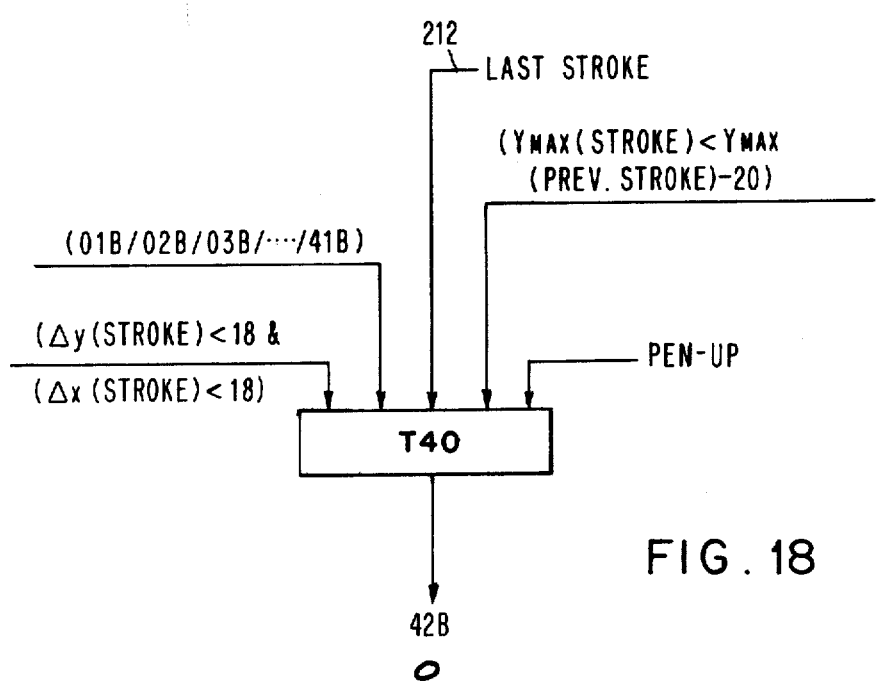

Referring to FIG. 18, there is shown the multi-segment stroke tree logic for identifying the stroke 42B. Here, a trigger T40 is set, the stroke is relatively small, it is the last stroke as indicated by line 216, and the stroke is above the last stroke.

Symbol Element Recognition

Figure 5:
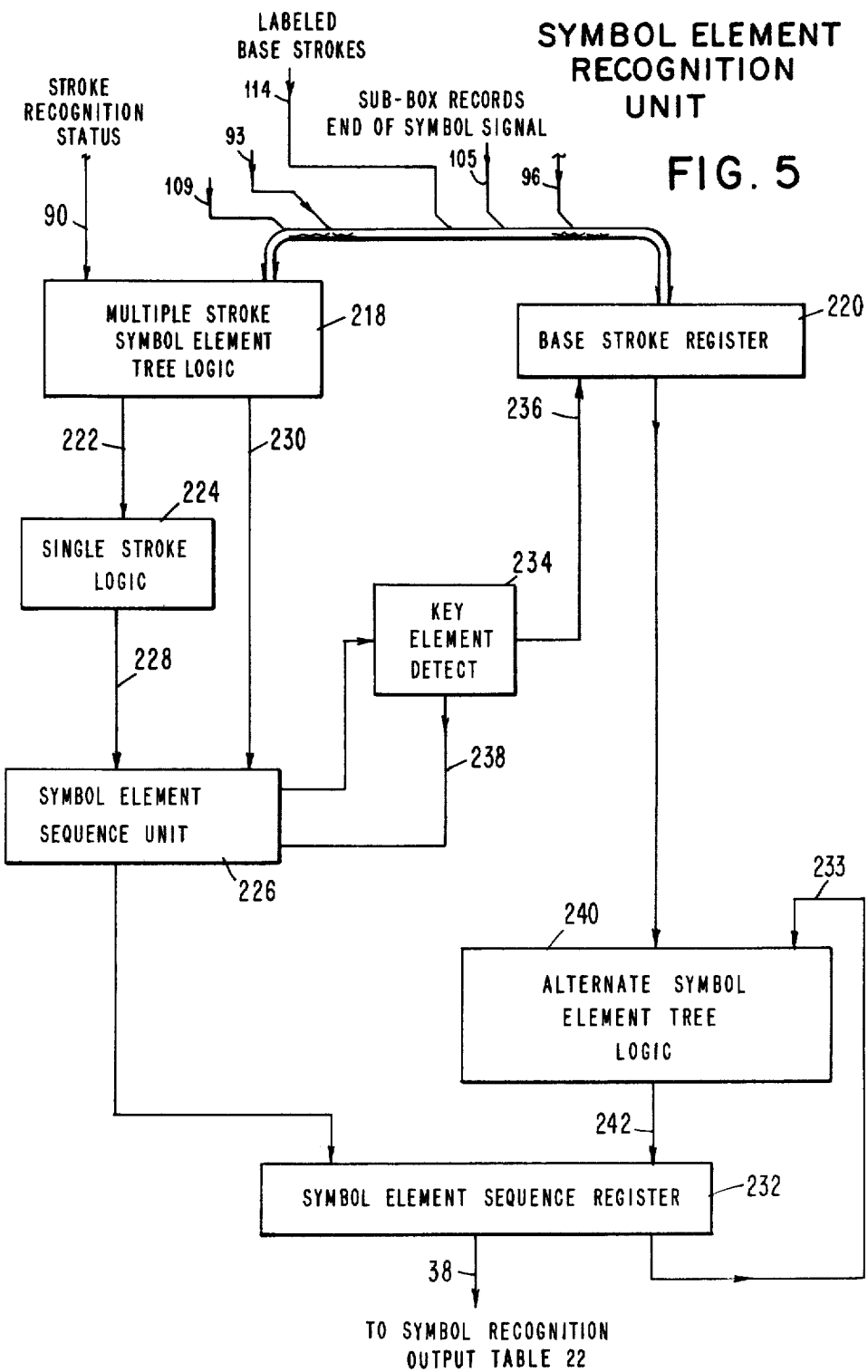
FIG. 5 is a circuit block diagram of the symbol element recognition unit.

FIG. 5 contains the block diagram for the symbol element recognition unit 20. A new output is received on line 114 from the base stroke recognition output logic 100 of FIG. 4 every time that a base stroke recognition occurs. It is accompanied by a change in the stroke recognition status output 90. Each new output that is presented to a multiple stroke symbol element tree logic 218 contains the stroke classification information on lines 90 and 114 from the base stroke classification unit shown in FIG. 4, the coordinates of the stroke boundaries on line 93, the crossing information 109, and the coordinates of the sub-box on line 105 that preceded each stroke. The final stroke of the symbol is followed by the end of symbol code on line 96. The sequence of base stroke information is also passed into a base stroke register 220 where it is held for possible future use in symbol element recognition. The multiple stroke symbol element tree logic 218 is illustrated in FIGS. 5.1-5.4 and analyzes the sequence of base stroke information to detect the presence of a sequence that defines one of the symbol elements. If a base stroke input should be one of the single stroke symbol element categories (the first 21 categories in Tables I and II), the output 222 is passed to a single stroke logic unit 224. If this single stroke element is one of the categories that accommodate alternative styles for single stroke symbols (i.e., 12E and 17E), the classification is made by further study of the two adjacent strokes in the single stroke logic unit 224. The classifications for all the single stroke elements is passed from the single stroke logic unit 224 into a symbol element sequence unit 226 via line 228.

The multiple stroke symbol element tree logic 218 makes a first pass recognition of symbol elements with more than one stroke. It recognizes the elements that occur in symbols with well defined structure and that are written in a conventional style. These symbol elements also pass into the symbol element sequence unit 226 via line 230 where they are combined with the single stroke elements in the order that they occurred. If all of the symbol elements are well defined, a sequence of proper symbol elements will accummulate in a symbol element sequence register 232. This sequence of symbol elements will be read out into the symbol recognition output table 22 when the end of symbol signal 96 occurs.

When the strokes that make up a symbol element do not satisfy the prescribed conditions for sequence, relative size or relative position, the multiple stroke symbol element tree logic 218 will be unable to convert the base stroke input sequence into a proper sequence of symbol elements. However, each of the input base strokes will always be accounted for in the output of the symbol element recognition. If a grouping of base strokes fails to satisfy a multiple stroke condition, the individual strokes are passed on to the single stroke logic unit 224 where they are assigned the single stroke symbol element classifications they resemble most closely. In some cases, failure to satisfy the prescribed criteria for a symbol element will not render that grouping of base strokes completely ambiguous when it is analyzed in the context of the symbol elements that precede or follow it. Therefore, added knowledge of the symbol elements that precede or follow a grouping of base strokes is used to make proper classification of the base strokes that occur in some of the more complex Kanji/Chinese symbols. Some of these complex symbols might have been written with an unprescribed sequence for a base stroke grouping that causes one or more symbol element failure. Others might have a different, similarly shaped base stroke substituted for the prescribed base stroke. Further consideration of the base stroke sequences that precede these occurrences can often be used to derive proper symbol element recognitions.

In order to cope with these situations, a key element detect unit 234 monitors the output of the symbol element sequence unit 226. When one of a special set of elements is observed, that can occur when there has been a variation in sequence or a substitute base stroke, the key element detect unit 234 operates to insert markers at corresponding points via lines 236 and 238, respectively, in the base stroke register 220 and the symbol element sequence unit 226. This event also initiates the analysis of prior information adjacent to the key element. Symbol elements that precede the key element marker in the symbol element sequence register 232 and base strokes that precede the key element marker in the base stroke register 220 are selected and copied into an alternate symbol element tree logic 240. This logic 240 analyzes the stroke information that pertains to the key element and creates a new sequence of symbol elements for that portion of the symbol. This new group of elements is then inserted via line 242 in the symbol element sequence register 232.

The sequence of base strokes that follow a key element will continue to enter the multiple stroke symbol element tree logic 218 and create the symbol element sequence. If another key element is detected, the key element detect unit 234 will insert additional markers at the appropriate places in the base stroke register 220 and the symbol sequence unit 226. An analysis will then be made of the base strokes that precede the markers by the alternative symbol element tree logic 240. This creates new symbol elements which are inserted into the symbol element sequence register 232. After all of the base strokes of the symbol have been presented to the multiple stroke symbol element tree logic 218, the end of symbol code on line 96 will reach the symbol element recognition unit. When this line 96 code is passed to the base stroke register 220, it causes all of the base stroke codes to be erased in preparation for the next symbol. When the end of symbol code reaches the tree logic unit 218, it is passed on through the symbol element sequence unit 226 to the symbol element sequence register 232. This causes the symbol element sequence to be read out to the symbol recognition output table 22.

As described above with respect to FIG. 5, the multiple stroke symbol element tree logic 218 keeps track of the boundaries of the sub-box in which each identified stroke lies. The tree logic comprises three parts. The first part of the tree logic identifies each of the distinct and separate occurrences of any of the 72 element alphabet symbols. Examples of such tree logic identification are the symbols identified in Table II as 70E, or 72E, or 54E. The second part of the tree logic is used for connected occurrences of two or more of the 72 element alphabet symbols. Examples of such connected occurrences are shown in FIG. 5.1.

The tree logic can be used to provide the same spelling for the expected alternative stroke sequence, such as shown in FIG. 5.2.

The third part of the multiple stroke symbol element tree logic is used for other distinctive patterns. Besides the connected patterns which are separable by a semi-straight cut, there may be other distinctive sub-patterns which may give rise to alternative spellings. For these, one can elect to trade-off between requiring storage for the alternative spellings, and using logic for detecting the various sequences and assigning the same spelling to each of the sequences which produce the same pattern. This can be effectively done in tree logic form for sequences which fan forward in time.

In the event certain symbols are constructable not only by different sequences of strokes, but also by different number of strokes, due to the separation or non-separation of strokes, it may be possible to use a tree logic which fans forward in time. But if these patterns have a kernal or a sub-pattern which is invariant in sequence and number of strokes, one can still derive a tree logic. An example is shown in FIG. 5.3.

The tree logic for the pattern shown in FIG. 5.3 is implemented by the alternate symbol element tree logic 240. Tree logic 240 will be described by example using the symbol shown in FIG. 5.4 with the invariant kernel or sub-pattern (2:42E). The tree logic is arrived at by first going forward in time from the kernel until the expected last stroke is encountered, and then going backward in time from the kernel until the expected first stroke is encountered.

FIG. 6.1 contains a schematic diagram of the symbol recognition output table 22. The sequence of symbol elements that is read out of the symbol element sequence register 232 when the end of symbol code occurs is used as an index number for access to the recognition output table 22. The order of the entries in the table 22 is determined by the codes of the symbol element sequence for each symbol. Several different table formats can be used for this purpose. The organization shown in FIG. 6.1 provides a fixed index field 250 for the index number 252 which is long enough to describe the symbol element sequence for the largest symbol. Zeros are added to fill out the index number 252 for all symbols to the same field length. Each index number 252 retrieves a symbol identification number 254 that represents that symbol to the printers, displays, storage units, communication lines or other input or output devices that are used with an information processing system. Each symbol can have several entries in the table 22. These correspond to the alternative symbol element sequences that can describe the symbol. Since these alternative symbol element sequences for a symbol can be quite different, the equivalent entries for any given symbol will not necessarily be adjacent to each other in this table 22.

Summarizing, the symbol recognition output table 22 contains a list of all the Chinese symbols 254 that are in the system's vocabulary: Each symbol 254 has associated with it all of the symbol element sequences 252 that correspond to it.

The symbol recognition output table 22 shown in FIG. 6.1 has associated with it a recognition table readout logic, shown in FIG. 6.2, and including a scanner or search comparator 256 and an output gate 258. The search comparator 256 receives the sequence of symbol elements 38 for a given input signal, and searches the recognition output table 22 to determine the identity of the symbol that is associated with that sequence of symbol elements, and via line 260 and gate 258, sends the symbol indentity code from line 254 through such gate 258 on line 262 to the desired output device.

While the invention has been particularly shown and described with reference to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. An on-line Chinese symbol recognition system with an extendable vocabulary comprising:
   an on-line tablet device that collects pen position signals as the Chinese symbol is written,
   signal filter and segment integration means for receiving pen coordinate signals and pen up/down signals from said tablet device to define segments of strokes which correspond to continuous motion of a pen on a tablet in a fixed direction,
   base stroke classifying means, connected to the output of said signal filter and segment integration means, to classify the motion of the pen between pen down and pen up occurrences into one of a predetermined number of base stroke categories, including means for determining if the stroke has crossed a prior stroke,
   symbol element recognition means, connected to the output of said base stroke classification unit, for analyzing the base stroke and crossing information to detect the occurrence of members of a predefined set of symbol elements, each of said symbol elements being graphically descriptive of portions of the shapes of Chinese symbols,
   a symbol recognition output table, connected to the output of said symbol element recognition means, which contains a list of all the Chinese symbols in the system's vocabulary, each symbol in the list having associated with it all of the symbol element sequences that correspond to it, and
   recognition table readout means which accepts the sequence of symbol elements for a given input symbol, searches the recognition output table to determine the identity of the symbol that is associated with that sequence of symbol elements, and sends the symbol identity code to the desired output device.

2. System as recited in claim 1, wherein said signal filter and line segment integration means include means for comparing current pen position data with previous, stored pen position data to thereby filter out excessive data due to pauses in the pen motion or due to random signal fluctuations, and a pause signal detector connected to said comparing means for detecting pause conditions considered in determining segments of strokes.

3. System as recited in claim 1, wherein said signal filter and line segment integration means includes means for determining the beginning and end points of each stroke, means for determining both the average and instantaneous line directions in a line segment for classifying each line segment into compass directions, and storage means for storing the end point coordinates and direction classification of each line segment for subsequent use in said base stroke classifying means.

4. System as recited in claim 3, wherein said means for determining both the average and instantaneous line directions in a line segment includes means for subtracting current point coordinates of a line segment from previous point coordinates.

5. System as recited in claim 1, wherein said base stroke classifying means includes logic means for classifying the line strokes based on the shape of each stroke, the position of each stroke and the intersection of each stroke with other strokes.

6. System as recited in claim 5, wherein said logic means includes stroke logic trees for classifying both single segment strokes and multi-segment strokes.

7. System as recited in claim 1, wherein said symbol element recognition means includes symbol position logic which analyzes the relative position of detected symbol elements and provides the logical representation for the entire symbol by determining the codes for the symbol elements and their sequence of presentation.

8. System as recited in claim 1, wherein said symbol recognition output table contains said list of all the Chinese symbols that are in the system's vocabulary, each symbol in the list having associated with it all of the symbol element sequences that correspond to it, and said list of Chinese symbols is extendable by adding to the table new symbols with their logical representation sequences of graphically descriptive symbol elements.

9. System as recited in claim 1, wherein said recognition table readout means includes a display of symbols representing the symbol elements in their approximate relative locations within the word symbol in order to provide the user with valuable feedback regarding the system's evaluation of his writing, and provides the user with means for displaying words that have not been included in the system's formal vocabulary.

10. System as recited in claim 1, wherein said recognition table readout means includes means for continuously enlarging the vocabulary of recognizable words by adding the codes for symbol elements to the symbol recognition output table.

* * * * *